(12) United States Patent
Nakamori et al.

(10) Patent No.: US 10,809,555 B2
(45) Date of Patent: Oct. 20, 2020

(54) FORCE SENSING DEVICE AND DISPLAY DEVICE COMPRISING THE SAME

(71) Applicant: Japan Display Inc., Tokyo (JP)

(72) Inventors: Yosuke Nakamori, Tokyo (JP); Ken Hirabayashi, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 15/663,982

(22) Filed: Jul. 31, 2017

(65) Prior Publication Data
US 2018/0031885 A1    Feb. 1, 2018

(30) Foreign Application Priority Data

Aug. 1, 2016 (JP) .................. 2016-151263

(51) Int. Cl.
| | |
|---|---|
| *G02F 1/1333* | (2006.01) |
| *G06F 3/041* | (2006.01) |
| *G01L 1/14* | (2006.01) |
| *F21V 8/00* | (2006.01) |
| *G02F 1/1339* | (2006.01) |
| *G06F 3/044* | (2006.01) |

(52) U.S. Cl.
CPC .......... *G02F 1/13338* (2013.01); *G01L 1/146* (2013.01); *G02B 6/0088* (2013.01); *G06F 3/0412* (2013.01); *G06F 3/0416* (2013.01); *G02B 6/0051* (2013.01); *G02B 6/0053* (2013.01); *G02B 6/0055* (2013.01); *G02B 6/0083* (2013.01); *G02F 1/1339* (2013.01); *G06F 3/044* (2013.01); *G06F 2203/04105* (2013.01)

(58) Field of Classification Search
CPC . G02F 1/13338; G02B 6/0088; G06F 3/0416; G06F 3/044; G06F 3/0412; G01L 1/146
USPC ....................................................... 345/173
See application file for complete search history.

(56) References Cited

U.S. PATENT DOCUMENTS

| | | | | |
|---|---|---|---|---|
| 7,609,178 | B2* | 10/2009 | Son ......................... | G06F 3/016 200/600 |
| 9,262,031 | B1* | 2/2016 | Moon ..................... | G06F 3/044 |
| 10,152,168 | B2* | 12/2018 | Kobayashi ............ | G06F 3/0412 |
| 2011/0175845 | A1 | 7/2011 | Honda et al. | |
| 2013/0199311 | A1* | 8/2013 | Horie ..................... | G01L 1/142 73/862.626 |
| 2014/0174189 | A1* | 6/2014 | Pan ........................ | G01L 9/0072 73/724 |

(Continued)

FOREIGN PATENT DOCUMENTS

JP    2011-100364    11/2009

*Primary Examiner* — Fred Tzeng
(74) *Attorney, Agent, or Firm* — K&L Gates LLP

(57) ABSTRACT

According to one embodiment, a force sensing device includes a first insulating layer, a first electrode layer on the first insulating layer, a second electrode layer provided in opposition to the first electrode layer, and an elastic layer held between one or both of the first insulating layer and the first electrode layer, and the second electrode layer, and configured to prevent the first and second electrode layers from coming into contact with each other even while allowing the first and second electrode layers to get close to each other. When the first electrode layer or the second electrode layer is pressed, the pressing force is sensed on the basis of a variation in the capacitance between the first electrode layer and the second electrode layer.

11 Claims, 18 Drawing Sheets

(56) References Cited

U.S. PATENT DOCUMENTS

| | | | | |
|---|---|---|---|---|
| 2014/0267134 A1* | 9/2014 | Bulea | .................. | G06F 3/044 345/174 |
| 2014/0333579 A1* | 11/2014 | Sleeman | ................. | G01L 1/146 345/174 |
| 2015/0002447 A1* | 1/2015 | Schediwy | ............. | G06F 1/1692 345/174 |
| 2015/0153887 A1* | 6/2015 | Kim | ........................ | G06F 3/044 345/173 |
| 2015/0268782 A1* | 9/2015 | Kim | ........................ | G06F 3/044 345/174 |
| 2015/0268783 A1* | 9/2015 | Yoon | ..................... | G06F 3/0414 345/173 |
| 2016/0026315 A1* | 1/2016 | Choi | ..................... | G06F 3/0414 345/174 |
| 2016/0034087 A1* | 2/2016 | Kim | ........................ | G06F 3/044 345/173 |
| 2016/0062505 A1* | 3/2016 | Hwang | ................. | G06F 3/0412 345/174 |
| 2016/0062537 A1* | 3/2016 | Kim | ....................... | G06F 3/0416 345/174 |
| 2016/0092015 A1* | 3/2016 | Al-Dahle | ............... | G06F 3/044 345/174 |
| 2016/0224171 A1* | 8/2016 | Kim | ....................... | G06F 3/0488 |
| 2016/0282999 A1* | 9/2016 | Hwang | .................. | G06F 3/044 |
| 2016/0299598 A1* | 10/2016 | Yoon | ....................... | G06F 3/044 |
| 2016/0299628 A1* | 10/2016 | Ribeiro | ................. | G06F 3/0414 |
| 2016/0342245 A1* | 11/2016 | Zhou | .................... | G06F 3/0412 |
| 2016/0349907 A1* | 12/2016 | Kobayashi | ............ | G06F 3/0412 |
| 2016/0370908 A1* | 12/2016 | Kim | ....................... | G06F 3/044 |
| 2017/0068376 A1* | 3/2017 | Kim | ....................... | G06F 3/0416 |
| 2017/0086704 A1* | 3/2017 | Gwin | ..................... | A61B 5/742 |
| 2017/0090674 A1* | 3/2017 | Meng | .................. | G02F 1/13338 |
| 2017/0102809 A1* | 4/2017 | Son | ....................... | G06F 3/0414 |
| 2017/0322662 A1* | 11/2017 | Hsieh | ............... | G02F 1/133305 |

* cited by examiner

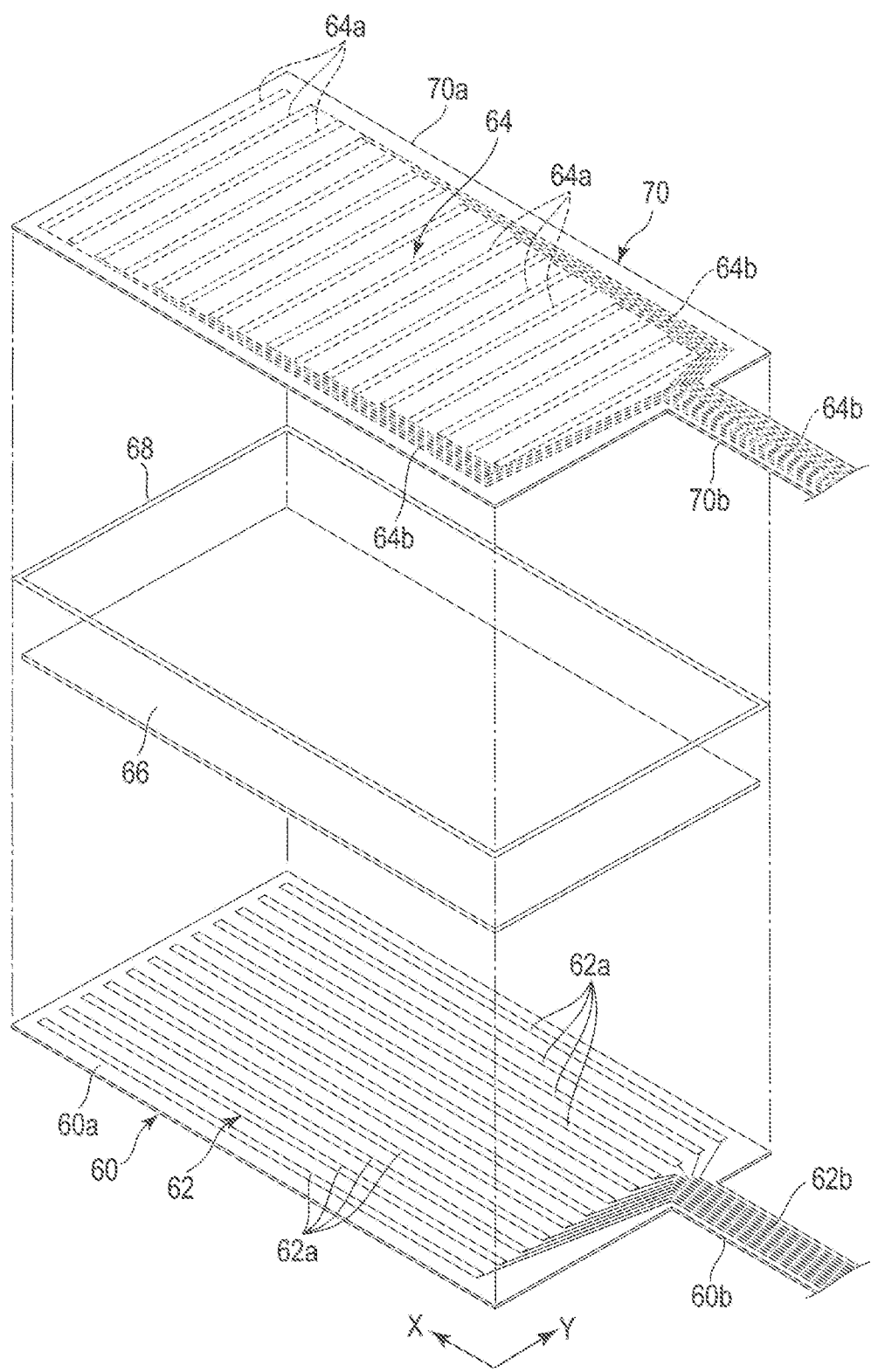
F I G. 11

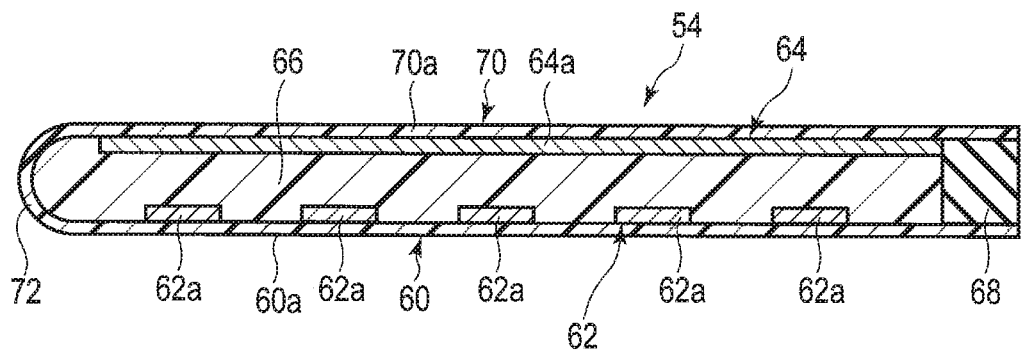
F I G. 12
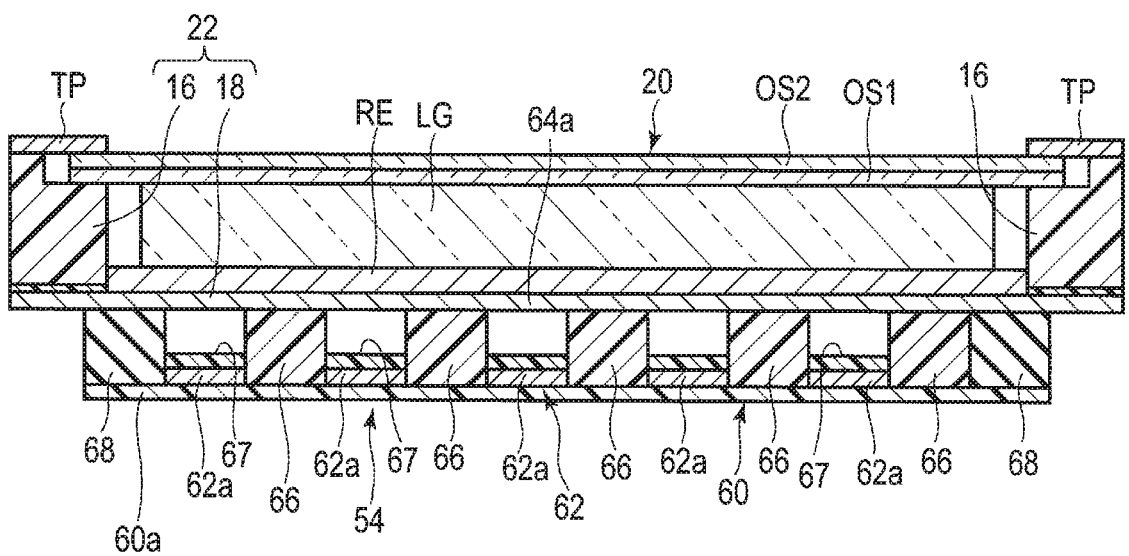
F I G. 13

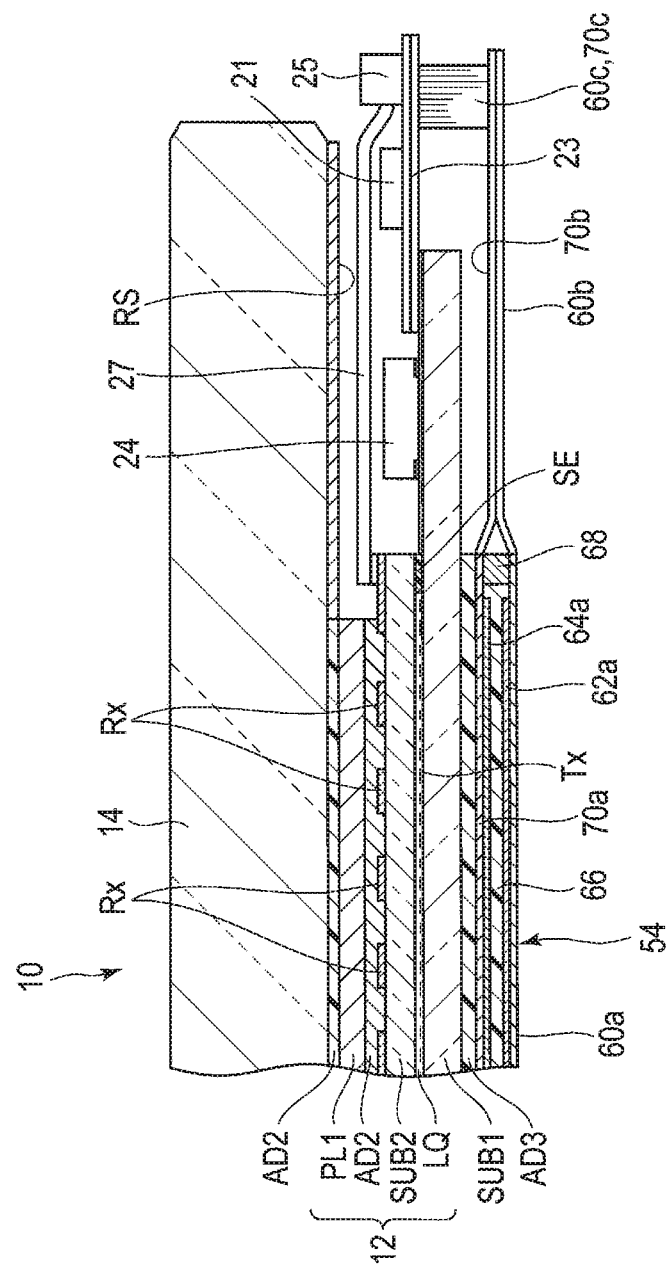
F I G. 20

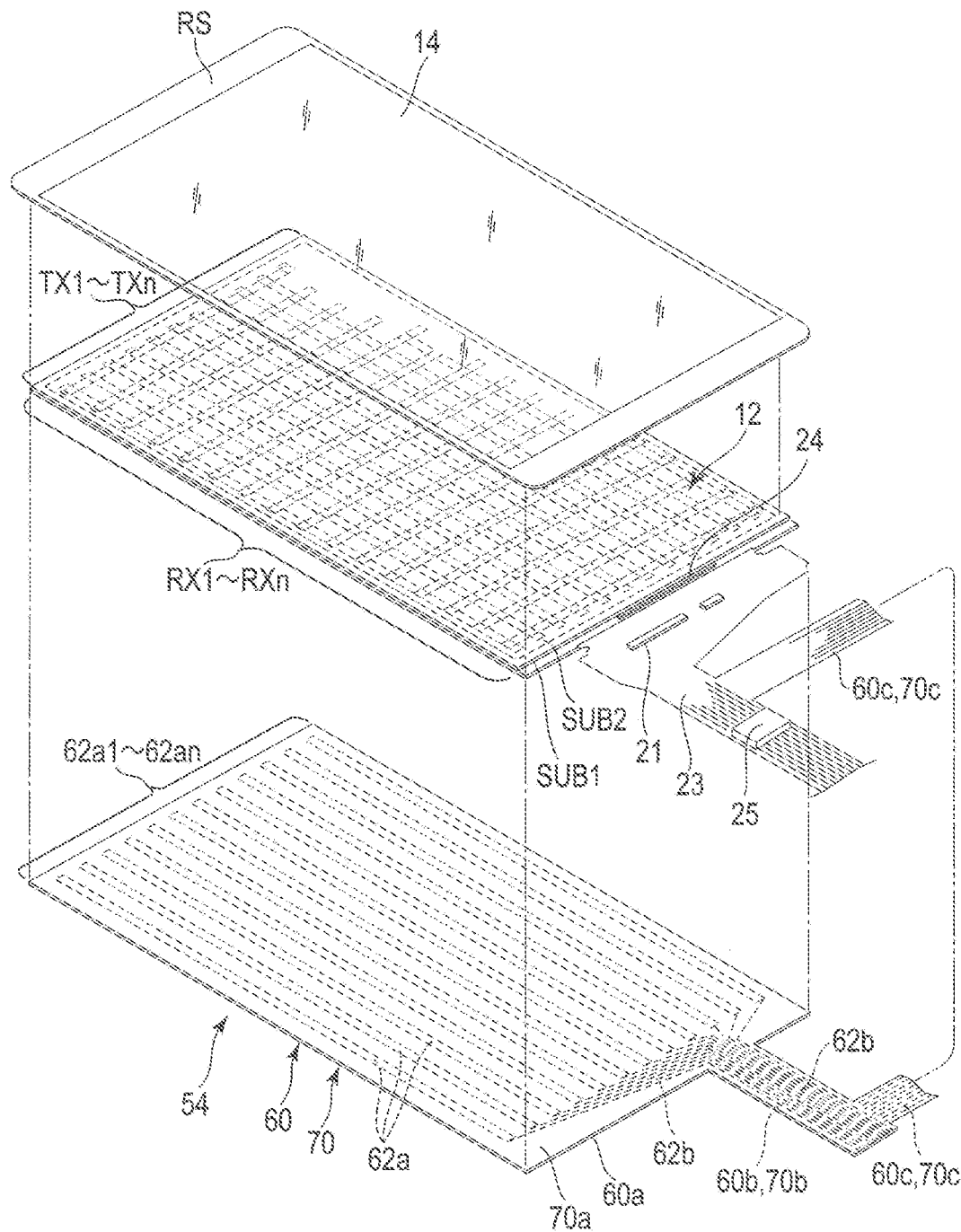
F I G. 21

FORCE SENSING DEVICE AND DISPLAY DEVICE COMPRISING THE SAME

CROSS-REFERENCE TO RELATED APPLICATIONS

This application is based upon and claims the benefit of priority from Japanese Patent Application No. 2016-151263, filed Aug. 1, 2016, the entire contents of which are incorporated herein by reference.

FIELD

Embodiments described herein relate generally to a force sensing device and a display device provided with the same.

BACKGROUND

In recent years, organic electroluminescent display devices and liquid crystal display devices are widely used as display devices of smartphones, personal digital assistants (PDAs), tablet computers, car navigation systems, and the like. In general, a liquid crystal display device comprises a liquid crystal panel, and lighting device (backlight device) overlaid on the rear surface of the liquid crystal panel, and configured to illuminate the liquid crystal panel. The backlight device includes a reflective layer, light guide, optical sheet, a light source such as LED (light emitting diode) and the like, and mold frame having a rectangular shape.

Further, there is proposed a liquid crystal display device provided with a force sensing function of sensing a pressing force input to the display surface to thereby carry out an arbitrary operation. In this liquid crystal display device, input detection of an electrostatic capacitance system of detecting a pressing force by converting a change in a distance between an electrode provided on the liquid crystal panel and an electrode provided in the backlight device at the time when a load (pressing force) is applied in a thickness direction of the display device into a change in the electrostatic capacitance is employed.

In the aforementioned liquid crystal display device, multilayer constituent members such as a light guide, optical sheets, and the like exist between an electrode on the display panel side and an electrode on the backlight device side. For this reason, due to a manufacturing error of the display device, variations are caused in the inter-electrode distance, and a variation is liable to occur in the force sensing capability of the individual product. Further, an inspection of the force sensing function cannot be carried out other than after completion of the entire display device including the liquid crystal panel and the backlight device. Accordingly, when a defect in force sensing occurs, the whole display device needs to be discarded or to be repaired, thereby creating a factor of increasing the defective work cost.

SUMMARY

The present disclosure generally relates to a force sensing device and a display device provided with the same.

According to one embodiment, a force sensing device includes a first insulating layer, a first electrode layer on the first insulating layer, a second electrode layer provided in opposition to the first electrode layer, and an elastic layer held between one or both of the first insulating layer and the first electrode layer, and the second electrode layer, and configured to prevent the first and second electrode layers from coming into contact with each other even while allowing the first and second electrode layers to get close to each other. When the first electrode layer or the second electrode layer is pressed, the pressing force is sensed on the basis of a variation in the capacitance between the first electrode layer and the second electrode layer.

Additional features and advantages are described herein, and will be apparent from the following Detailed Description and the figures.

BRIEF DESCRIPTION OF THE DRAWINGS

FIG. 11 is an exploded perspective view of a force sensing module according to a third modification example.

FIG. 12 is a cross-sectional view of a force sensing module according to a fourth modification example.

FIG. 13 is a cross-sectional view of a force sensing module according to a fifth modification example.

FIG. 20 is a cross-sectional view showing part of the display device according to the fourth embodiment.

FIG. 21 is an exploded perspective view of the display device according to the fourth embodiment.

DETAILED DESCRIPTION

Figure 1:
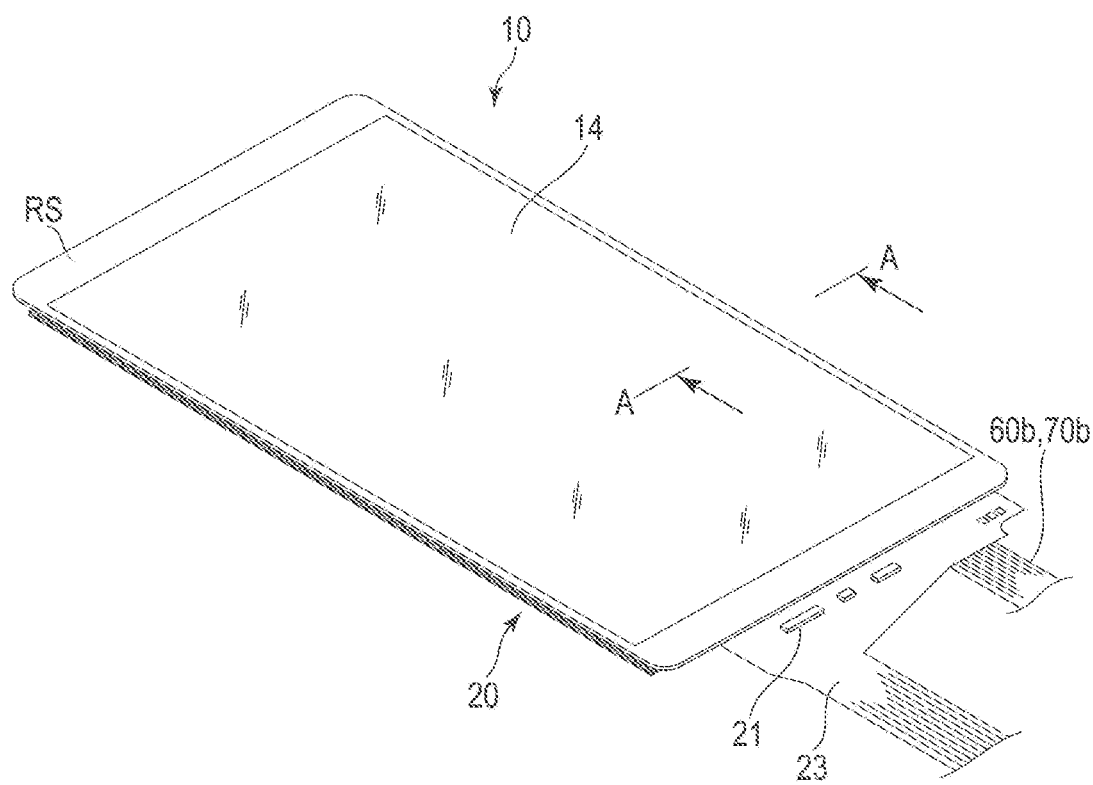
FIG. 1 is a perspective view showing the display surface side of a liquid crystal display device according to a first embodiment.

Various embodiments will be described hereinafter with reference to the accompanying drawings. In general, according to one embodiment, a force sensing device comprises a first insulating layer; a first electrode layer on the first insulating layer; a second electrode layer provided in opposition to the first electrode layer; and an elastic layer held between one or both of the first insulating layer and the first electrode layer, and the second electrode layer, and configured to prevent the first and second electrode layers from coming into contact with each other even while allowing the first and second electrode layers to get close to each other. When the first electrode layer or the second electrode layer is pressed, the pressing force is sensed on the basis of a variation in the capacitance between the first electrode layer and the second electrode layer corresponding to a variation in a distance between the first electrode layer and the second electrode layer.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

First Embodiment

Figure 2:
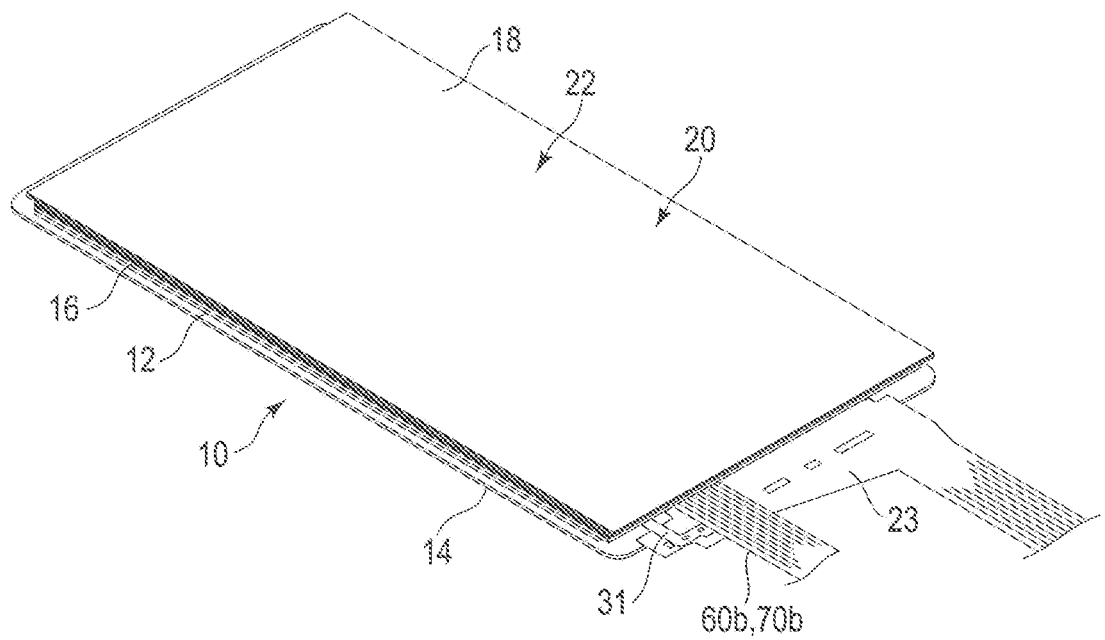
FIG. 2 is a perspective view showing the rear surface side of the liquid crystal display device.
Figure 3:
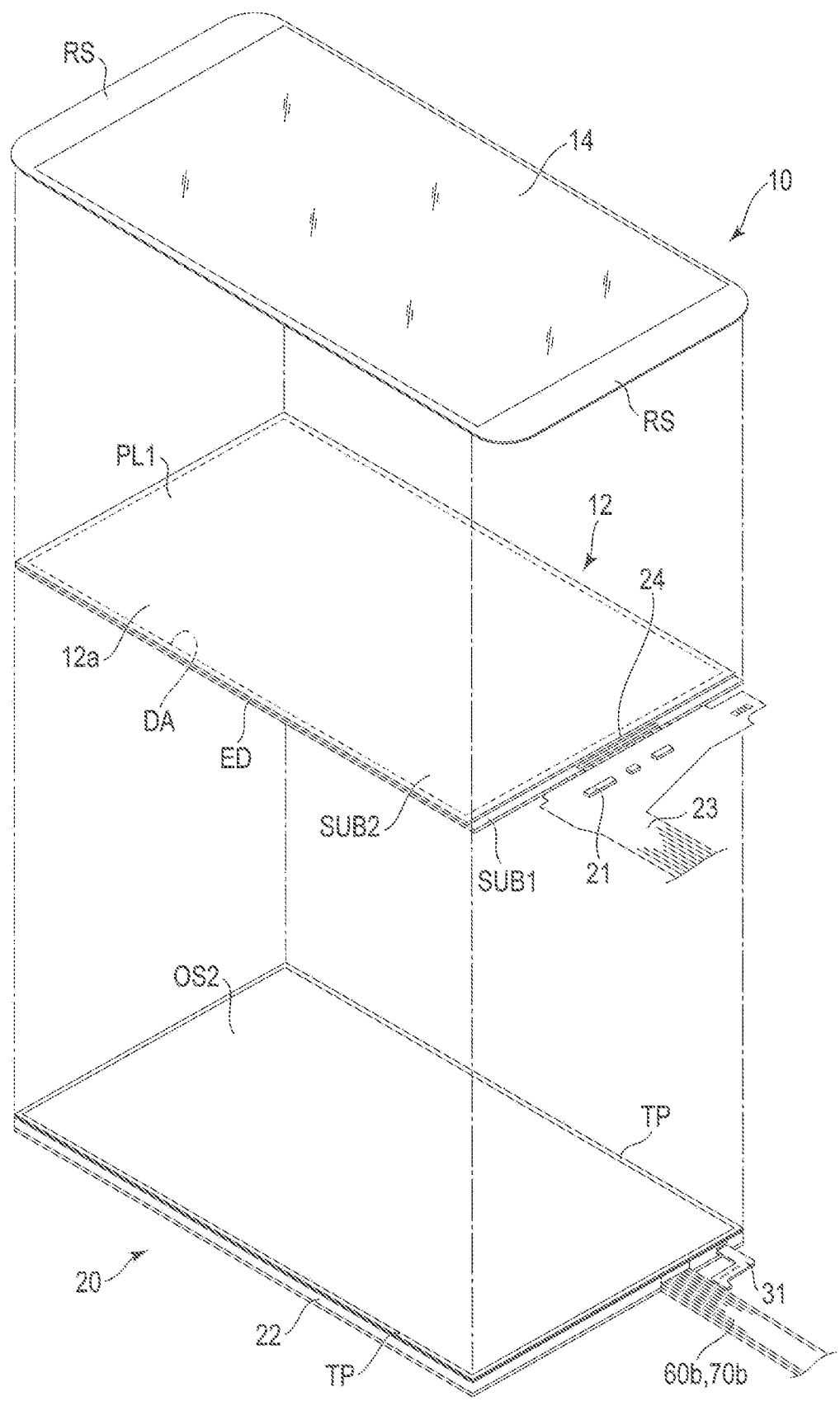
FIG. 3 is an exploded perspective view of the liquid crystal display device.

FIG. 1 and FIG. 2 are perspective views respectively showing the display surface side and the rear surface side of a liquid crystal display device according to a first embodiment, and FIG. 3 is an exploded perspective view of the liquid crystal display device.

A liquid crystal display device 10 can be incorporated in various types of electronic equipment such as a smartphone, tablet terminal, mobile telephone, notebook PC, portable video game player, electronic dictionary, television device, car navigation system, vehicle-mounted display panel, and the like to be used.

As shown FIG. 1 to FIG. 3, the liquid crystal display device 10 comprises an active-matrix liquid crystal panel 12, a transparent cover panel 14 arranged on a display surface 12a which is one surface of the liquid crystal panel 12, and covering the whole display surface 12a, and a backlight unit (backlight device) 20 arranged in opposition to the rear surface side which is the other surface of the liquid crystal panel 12. The cover panel 14 can be omitted according to the status of use.

Figure 4:
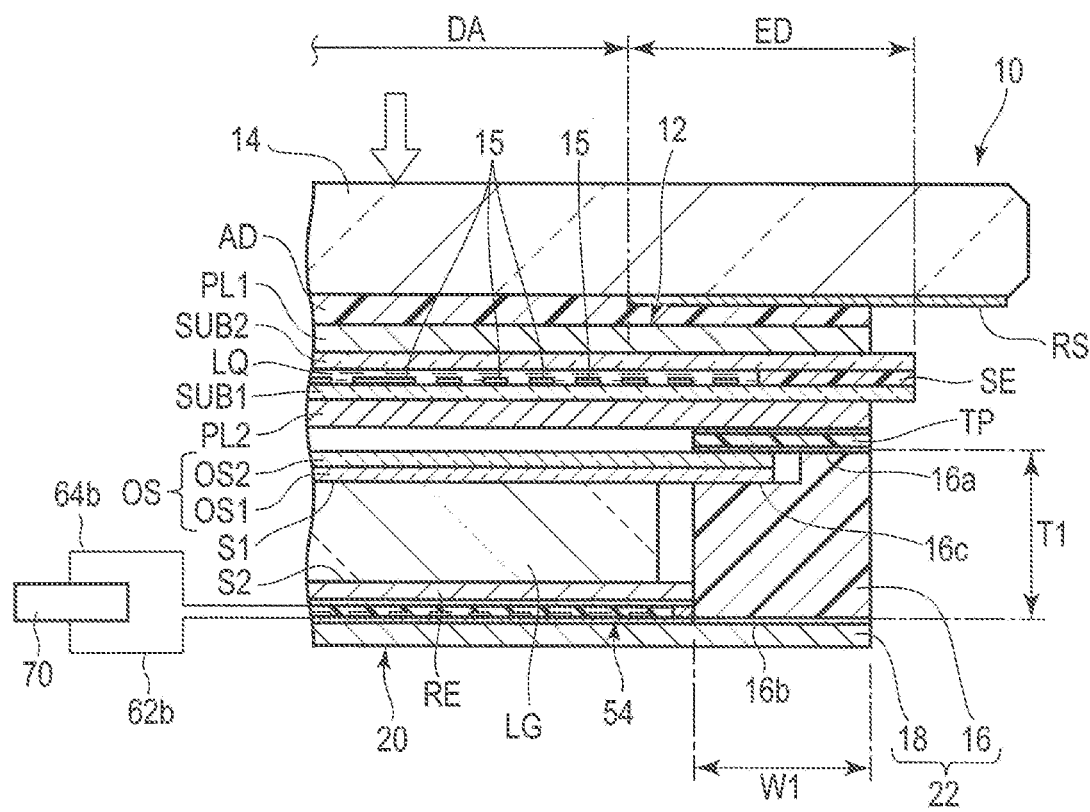
FIG. 4 is a cross-sectional view of the liquid crystal display device taken along line A-A of FIG. 1.

FIG. 4 is a cross-sectional view of the liquid crystal display device taken along line A-A of FIG. 1. As shown in FIG. 3 and FIG. 4, the liquid crystal panel 12 comprises a rectangular first substrate SUB1, a rectangular second substrate SUB2 arranged in opposition to the first substrate SUB1, and a liquid crystal layer LQ sealed between the first substrate SUB1 and the second substrate SUB2. A peripheral edge part of the second substrate SUB2 is stuck to the first substrate SUB1 with a sealing member SE. A polarizer PL1 is stuck to a surface of the second substrate SUB2 to form the display surface 12a of the liquid crystal panel 12. A polarizer 2 is stuck to a surface (the rear surface of the liquid crystal panel 12) of the first substrate SUB1. Further, on an inner surface of at least one of the substrates, for example, the first substrate SUB1, a plurality of electrode sections 15 such as pixel electrodes, common electrodes, and the like, and lines (not shown), and the like are formed.

On the liquid crystal panel 12, a rectangular display area (active area) DA is provided inside the sealing member SE as the liquid crystal panel 12 is seen in plan view (in other words, when the liquid crystal panel is seen from the normal direction of the display surface). An image is displayed on the display area DA. A rectangular frame area (non-display area) ED is provided around the display area DA. The liquid crystal panel 12 is a transmissive liquid crystal panel having a transmissive display function of displaying an image by selectively transmitting or modulating the light from the backlight unit 20 to the display area DA. The liquid crystal panel 12 may have a structure provided for the lateral electric field mode which mainly utilizes a lateral electric field parallel to the main surface of the substrate, or a structure provided for the vertical electric field mode which mainly utilizes a vertical electric field crossing the main surface of the substrate.

In the example shown in the drawing, on an end part of the short side of the first substrate SUB1, a semiconductor device such as a drive IC chip 24 or the like is mounted as a signal supply source for supplying a signal needed to drive the liquid crystal panel 12. The drive IC chip 24 is formed into a thin rectangular shape, and is mounted on the first substrate SUB1 along the side edge of the short side of the second substrate SUB2. Further, a flexible printed circuit board (main FPC) 23 is joined to a short side end of the first substrate SUB1, and is outwardly extended from the liquid crystal panel 12. The main FPC 23 is electrically connected on the first substrate SB1 to the drive IC chip 24 through a plurality of lines (not shown). On the main FPC 23, other semiconductor devices such as an IC 21 and the like may be mounted.

As shown in FIG. 1 to FIG. 4, the cover panel 14 is formed of a glass plate or an acrylic transparent resin or the like into a rectangular flat plate. As the cover panel 14, a configuration in which four corners are formed into arc-shapes may be also employable. The cover panel 14 has a width and a length larger than the dimensions (width and length) of the liquid crystal panel 12, and has an area larger than the liquid crystal panel 12 in planar view. At a peripheral edge part of the back surface (surface on the liquid crystal panel 12 side) of the cover panel 14, a frame-shaped light shielding layer RS is formed. In the cover panel 14, the area other than the area opposed to the display area DA is light-shielded by the light shielding layer RS. The light shielding layer RS may be formed on the top surface (display surface) of the cover panel 14.

The back surface of the cover panel 14 is stuck to the polarizer PL1 of the liquid crystal panel 12 with an adhesive having optical transparency or a transparent adhesive or an adhesive agent, for example, an adhesive member AD constituted of an optical transparent resin, and covers the whole surface of the display surface 12a of the liquid crystal panel 12. It should be noticed that the adhesive member AD is formed into a size identical to the polarizer PL1, and is stuck to the polarizer PL1 in order.

When a state where the cover panel 14 is stuck to the liquid crystal panel 12 is in planar view, the peripheral edge part of the cover panel 14 outwardly protrudes from the outer circumferential edge of the liquid crystal panel 12. Each long side of the cover panel 14 and each long side of the liquid crystal panel 12 are in a state where they are approximately in parallel with each other with a predetermined distance held between them. Each short side of the cover panel 14 and each short side of the liquid crystal panel 12 are in a state where they are approximately in parallel with each other with a predetermined distance held between them. In this embodiment, the distance between each long side of the cover panel 14 and each long side of the liquid crystal panel 12, i.e., the width of the peripheral edge part of the long side of the cover panel 14 is made smaller than a distance between the short side of the cover panel 14 and the short side of the liquid crystal panel 12, i.e., the width of the peripheral edge part of the short side of the cover panel.

Figure 5:
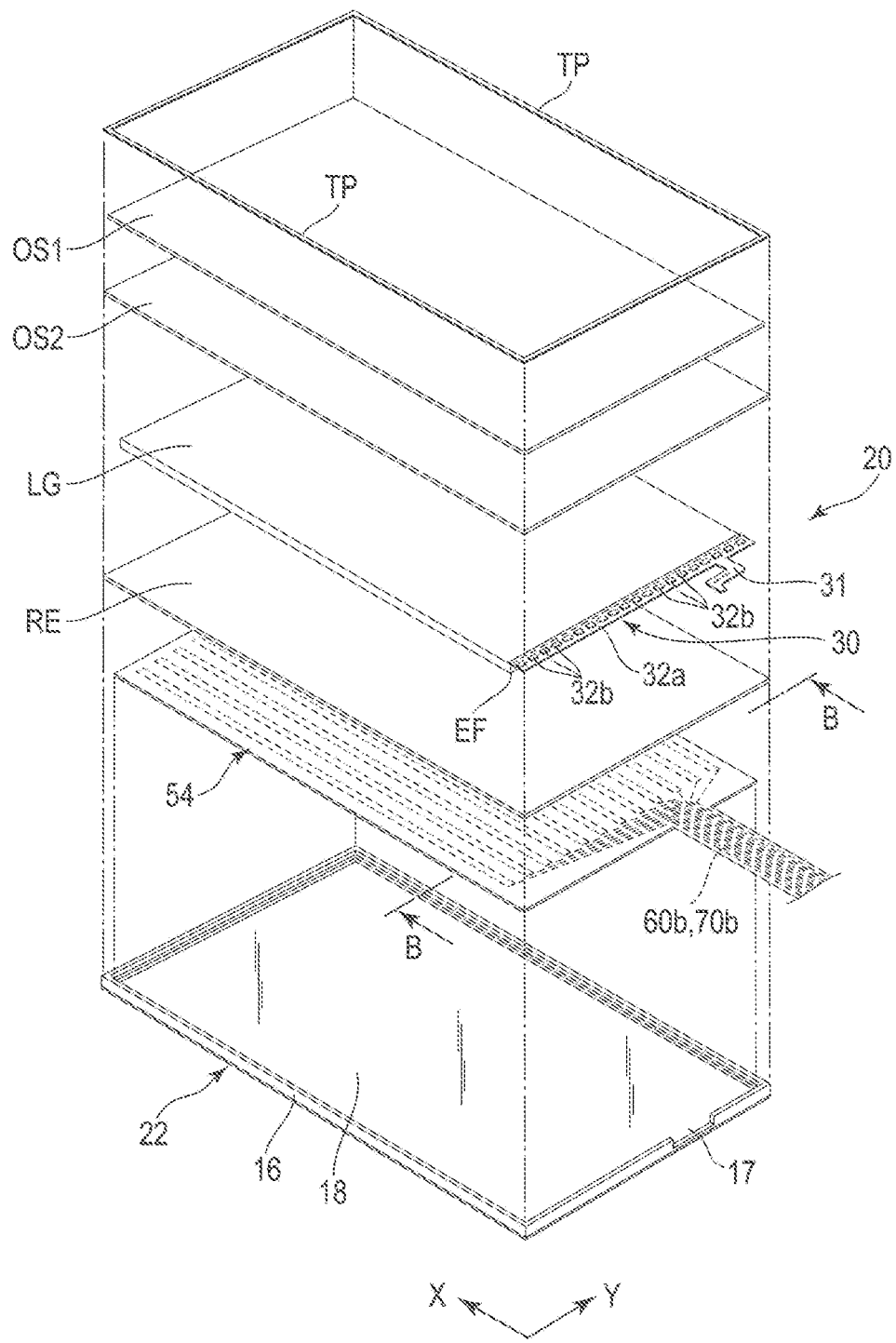
FIG. 5 is an exploded perspective view of a backlight device and a force sensing module.

FIG. 5 is an exploded perspective view of the backlight unit 20. As shown in FIG. 3, FIG. 4, and FIG. 5, the backlight unit 20 is provided with a flat rectangular case (or bezel) 22, reflection sheet RE arranged on a bottom surface of the case 22, a plurality of optical members arranged in the case 22, and light source unit 30 configured to supply light to be incident on the optical members. In this embodiment, a force sensing module (force sensing device) 54 is arranged between a bottom plate 18 of the case 22 and the reflection sheet RE.

The case 22 includes a rectangular support frame 16 having a first face (top face) 16a and a second face (lower face) 16b on the opposite side of the first face 16a, and rectangular bottom plate 18 stuck to the second face 16b of the support frame 16, and constituting the bottom of the case 22. The support frame 16 is formed of a synthetic resin such as a polycarbonate resin or the like by molding, and is formed into a size as shown in, for example, FIG. 4, i.e., a size having a width W1 of about 0.50 mm, height T1 of about 0.45 mm. Further, external dimensions of the support frame 16 are made substantially equal to external dimensions of a polarizer PL2 of the liquid crystal panel 12. It should be noticed that the support frame 16 may be formed of an elastic material including a rubber material.

The support frame 16 has a step 16c which is lower and formed in the inner circumferential side of the first face 16a. The height (depth) of the step 16c is made equal to film thicknesses of two films, i.e., a film thickness of a first optical sheet OS1 and a film thickness of a second optical sheet OS2 to be described later. The bottom plate 18 is formed of, for example, a stainless steel plate (SUS plate) having a thickness of 0.3 mm.

The rectangular force sensing module 54 is laid on the bottom plate 18. The force sensing module 54 comprises a flexible printed circuit board (FPC) and an elastic layer. The force sensing module 54 has external dimensions approximately equal to the internal dimensions of the support frame 16, and covers approximately the whole surface of the bottom plate 18. A detailed configuration of the force sensing module 54 will be described later.

As shown in FIG. 4 and FIG. 5, the reflection sheet RE and a light guide LG are placed on the force sensing module 54 in sequence. The reflection sheet RE has external dimensions approximately equal to the internal dimensions of the support frame 16, and covers approximately the whole surface of each of the bottom plate 18 and the force sensing module 54. As the reflection sheet RE, a reflection sheet having a film thickness of 200 μm or less, desirably 50 to 90 μm, and a reflectance of 90% or more, desirably 95% or more is used. The backlight unit 20 comprises, as optical members, the light guide LG having a rectangular shape in planar view, and a plurality of, for example, two optical sheets including the first optical sheet OS1 and second optical sheet OS2 laid on the light guide LG. It should be noted that the number of the optical sheets is not limited to two, and three or more optical sheets may be used.

The light guide LG includes a first main surface S1 serving as an emission plane, second main surface S2 on the opposite side of the first main surface S1, and incidence surface EF connecting the first main surface S1 and the second main surface S2 to each other. In this embodiment, one side surface on the short side of the light guide LG is made an incidence surface EF. The light guide LG has external dimensions (length and width) slightly smaller than the internal dimensions of the support frame 16 in planar view, and slightly greater than the display area DA of the liquid crystal panel 12. The light guide LG is arranged inside the support frame 16 in a state where the second main surface S2 is opposed to the reflection sheet RE, and is placed on the reflection sheet RE. The light guide LG has a plate thickness of, for example, about 0.23 to 0.32 mm.

The incidence surface EF of the light guide LG is opposed to the short side part of the support frame 16 with a small gap held between them. As shown in FIG. 5, the light source unit 30 includes, for example, a belt-shaped circuit board 32a, and a plurality of light sources (for example, LEDs) 32b mounted in line on the circuit board 32a. The light source unit 30 is arranged inside the support frame 16 in such a manner that the plurality of light sources 32b are opposed to the incidence surface EF of the light guide LG.

As shown in FIG. 3 to FIG. 5, according to this embodiment, as the first optical sheet OS1, and the second optical sheet OS2, for example, a diffusion sheet and a prism sheet each having optical transparency and formed of an acrylic or silicon series synthetic resin are used. The first optical sheet OS1 is formed into a rectangular having external dimensions slightly smaller than the external dimensions of the support frame 16.

The first optical sheet OS1 is placed on the first main surface S1 of the light guide LG. Further, the peripheral edge part of the first optical sheet OS1 is placed on the step 16c of the support frame 16. The second optical sheet OS2 is placed on the first optical sheet OS1, and furthermore the peripheral edge part of the second optical sheet OS2 is placed on the first optical sheet OS1 and on the step 16c of the support frame 16. A top surface of the peripheral edge part of the second optical sheet S2 is in the same plane as the first face 16a of the support frame 16, i.e., the top surface of the peripheral edge part of the second optical sheet S2 is flush with the first face 16a. It should be noticed that the number of the optical sheets is not limited two, and a configuration in which one or three or more optical sheets are used may be employed.

The backlight unit 20 includes a rectangular frame-shaped adhesive member (for example, a double-sided adhesive tape) TP configured to stick the backlight unit 20 to the liquid crystal panel 12. The adhesive member TP is has a width identical to the support frame 16 in planar view. The adhesive member TP is stuck to the first face 16a and the peripheral edge part of the second optical sheet OS2. Thereby, the second optical sheet OS2 is fixed to the support frame 16 through the adhesive member TP.

It should be noticed that the wordings such as the grammatical "identical" and "equal" are not to positively exclude errors inevitable in the manufacture of the actual product or previously allowing a tolerance for such errors at the time of design, and include, from this point of view, those which can be said to be approximately identical to each other. The same applies to the description after this.

The backlight unit 20 constituted in the manner is, as shown in FIG. 2 to FIG. 4, arranged in opposition to the rear surface of the liquid crystal panel 12, and is attached to the polarizer PL2 of the liquid crystal panel 12 with the adhesive member TP. The support frame 16 is stuck to the peripheral edge part of the rear surface of the polarizer PL2 with the adhesive member TP, and is arranged in a state where the outer peripheral edge of the support frame 16 and the outer peripheral edge of the adhesive member TP are flush with the peripheral edge of the polarizer PL2.

The support frame 16 is opposed to the frame area ED of the liquid crystal panel 12, and the first and second optical sheets OS1 and OS2, and the light guide LG are opposed to the display area DA of the liquid crystal panel 12. The optical sheet OS is opposed to the liquid crystal panel 12 with a gap corresponding to the thickness T2 of the adhesive member TP held between them.

The printed circuit board 32a of the light source unit 30 is connected to the main FPC 23 through a connection terminal part 31 (see FIG. 2). Thereby, a drive current is supplied to the LED 34 through the main FPC 23 and the printed circuit board 32a. Light emitted from the LED 34 enters the light guide LG from the incidence surface EF, is propagated through the inside of the light guide LG or is reflected from the reflection sheet RE after being emitted from the second main surface S2 of the light guide LG, and then again enters the light guide LG. After passing through such a light path, the light from the LED 34 is emitted from the whole surface of the first main surface (emission surface) S1 toward the liquid crystal panel 12 side. The emitted light is diffused by the first optical sheet OS1 and the second optical sheet OS2, and is thereafter made to irradiate the display area DA of the liquid crystal panel 12.

Figure 6:
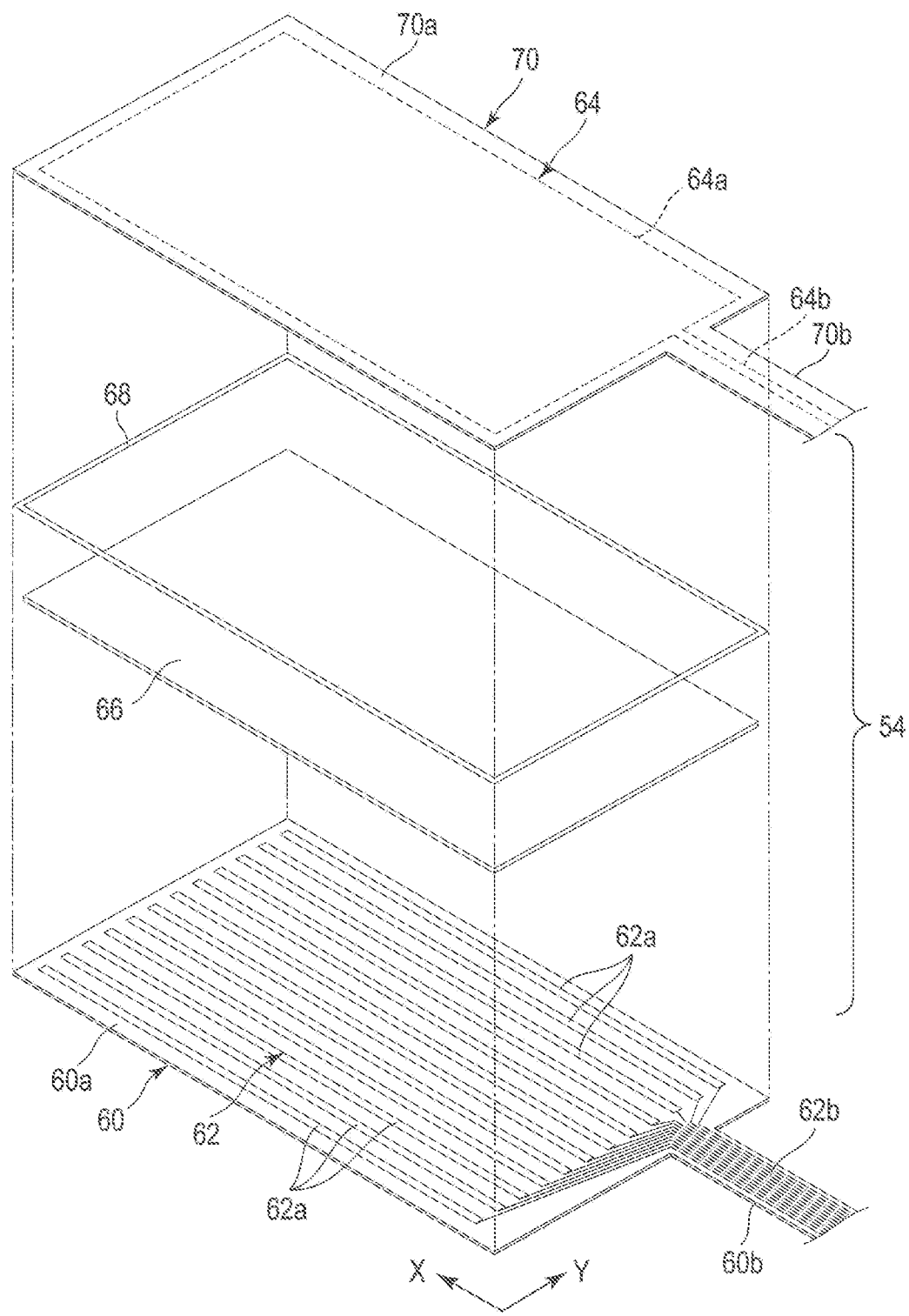
FIG. 6 is an exploded perspective view of the force sensing module.

In this embodiment, the liquid crystal display device 10 has a force sensing function of sensing a pressing force input to the cover panel 14. That is, the liquid crystal display device 10 is provided with the force sensing module (force sensing device) 54. FIG. 6 is an exploded perspective view of the force sensing module 54, and FIG. 7 is a cross-sectional view of the force sensing module 54 taken along line B-B of FIG. 5.

Figure 7:
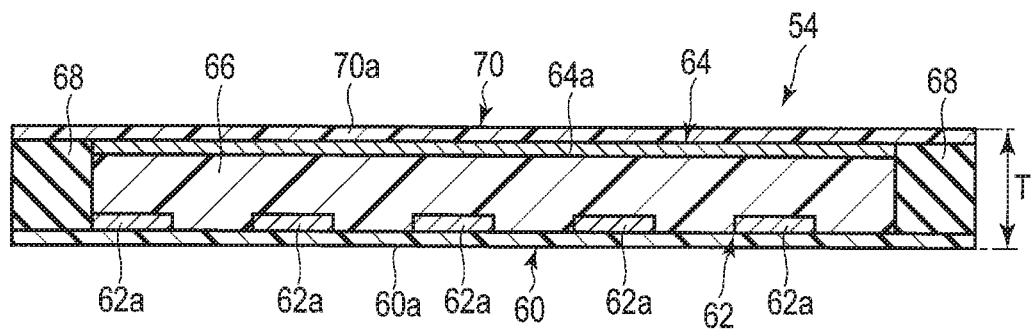
FIG. 7 is a cross-sectional view of the force sensing module taken along line B-B of FIG. 5.

As shown in FIG. 5 to FIG. 7, the force sensing module 54 comprises a first insulating layer 60 formed of a polyimide or the like, first electrode layer 62 provided on the first insulating layer 60, second insulating layer 70 formed of a polyimide or the like, and opposed to the first insulating layer 60 with a gap held between them, second electrode layer 64 provided on the second insulating layer 70, and opposed to the first electrode layer 62, and elastic layer 66 held between the first electrode layer 62 and the second electrode layer 64. The force sensing module 54 is formed into a sheet-shape nearly like a flexible printed circuit board (FPC).

The first insulating layer 60 is provided with a rectangular main body 60a having external dimensions (length, width) slightly smaller than the internal dimensions of the support frame 16 in planar view, and slightly larger than the display area DA of the liquid crystal panel 12. Further, the first insulating layer 60 includes a belt-shaped part 60b outwardly extending from one short side of the main body 60a in an integrated form. The first electrode layer 62 is formed of, for example, copper foil, and includes a plurality of stripe-shaped first electrodes 62a respectively extending in the longitudinal direction (first direction X) of the main body 60a. The plurality of first electrodes 62a are arranged in the width direction (second direction Y) of the main body 60a at predetermined intervals. Furthermore, the first electrode layer 62 includes a plurality of first lines 62b respectively extending from ends of the first electrodes 62a in the longitudinal direction and further extending along the surface of the belt-shaped part 60b. It should be noticed that the number, shape, and the like of the first electrodes 62a are not limited to the embodiment shown in the drawings, and can be variously changed.

The second insulating layer 70 is provided with a main body 70a formed into a rectangular shape having external dimensions (length, width) approximately equal to the main body 60a of the first insulating layer 60. The second insulating layer 70 further includes a belt-shaped part 70b outwardly extending from one short side of the main body 70a in an integrated form. The second electrode layer 64 constitutes a rectangular second electrode 64a having external dimensions slightly smaller than the external dimensions of the main body 70a. The second electrode 64a is uniformly provided over approximately the whole surface of the main body 70a except the peripheral edge part of the main body 70a. Furthermore, the second electrode layer 64 includes a second line 64b extending from one end of the second electrode 64a and further extending on the surface of the belt-shaped part 70b. It should be noticed that the shape and the like of the second electrode 64a are not limited to the embodiment shown in the drawings, and can be variously changed and may be divided into a plurality of electrodes as will be described later.

In the first insulating layer 60 and the second insulating layer 70, their peripheral edge parts are stuck to each other with, for example, a frame-shaped adhesive member (adhesive) 68. Thereby, the first electrode layer 62 and the second electrode layer 64 are opposed to each other with a gap. Further, the belt-shaped part 60b is stuck to the belt-shaped part 70b with an insulating adhesive agent not shown.

Between the first electrode layer 62 and the second electrode layer 64, and between the first insulating layer 60 and the second insulating layer 70, an elastic layer 66 is provided. The elastic layer 66 is formed of a material having elasticity such as rubber, a synthetic resin, and the like. In this embodiment, the elastic layer 66 is constituted of, for example, a rectangular rubber sheet having a thickness of about 50 μm. The elastic layer 66 has external dimensions slightly smaller than the main body 60a of the first insulating layer 60, and is laid inside the adhesive agent 68. The elastic layer 66 is laid on top of the first electrodes 62a and the main body 60a of the first insulating layer, and is in close contact with the first electrodes 62a and the main body 60a. Further, the elastic layer 66 is opposed to or abuts on the second electrode 64a. The elastic layer 66 is opposed to the second electrode 64a through an air layer, i.e., through a small gap. In this embodiment, the elastic layer 66 is in close contact with the second electrode 64a. A layer thickness of the elastic layer 66 is made a thickness approximately equal to a gap between the first electrodes 62a and the second electrode 64a, and a gap between the first insulating layer 60 and the second electrode layer 64. It should be noted that although there can be a case where a small gap, i.e., an air layer is created between the elastic layer 66 and the first electrodes 62a or between the elastic layer 66 and the second electrode 64a due to a manufacturing error or the like, in this case too, such a state is regarded as being substantially within the range of the expression of "abutting". The material for the elastic layer 66 is not limited to the rubber sheet, and the elastic layer 66 may be formed by filling a gap between the first insulating layer 60 and the second insulating layer 70 with an elastic material in the molten state or the elastic layer 66 may be formed on the first insulating layer 60 and the first electrodes 62a by screen printing using an elastic material in the molten state as a printing material.

As shown in FIG. 7, the thickness T of the force sensing module 54 constituted as described above is made about 0.1 to 0.2 mm. The force sensing module 54 can be placed at an arbitrary position of the liquid crystal display device 10. As shown in FIG. 4 and FIG. 5, in this embodiment, the force sensing module 54 is incorporated in the backlight unit 20. That is, the force sensing module 54 is laid on the bottom plate 18 of the case 22, and is located between the bottom plate 18 and the reflection sheet RE. Approximately the whole surface of the force sensing module 54 is opposed to the display area DA of the liquid crystal panel 12 approximately in parallel with the display area DA with the reflection sheet RE and the optical member held between them. In this embodiment, although the force sensing module 54 is arranged inside the case 22 in a state where the first insulating layer 60 abuts on the bottom plate 18, the force sensing module 54 may also be placed in a state where the force sensing module 54 is turned over, i.e., in a state where the second insulating layer 70 abuts on the bottom plate 18. The belt-shaped parts 60b and 70b of the force sensing module 54 extend to the outside of the case 22 through a notch or an opening 17 of the support frame 16.

As shown in FIG. 4, the force sensing module 54 comprises a controller 70 electrically connected to the first electrodes 62a and the second electrode 64a through the first lines 62b and the second line 64b. The controller 70 is constituted of, for example, a drive IC (not shown) mounted on the belt-shaped part 70b or on the main FPC 23.

During a force sensing period, the controller 70 transmits a sensor drive signal to one of the first electrode group 62a and the second electrode 64a, for example, the first electrodes 62a. In this state, when the operator touches the cover panel 14 with his or her finger or the like, the cover panel 14 and the liquid crystal panel 12 are slightly bent toward the bottom plate 18 side of the backlight unit 20 with the pressed part being the center of the bend. Due to this bending, the liquid crystal panel 12 presses the second electrode 64a of the force sensing module 54 through the optical sheet OS, light guide LG, and reflection sheet RE. The elastic layer 66 is pressed together with the second electrode 64a, and is elastically deformed in the constriction direction (thickness direction). Thereby, the second electrode 64a is displaced toward the first electrodes 62a side, and the distance between the first electrodes 62a and the second electrode 64a is varied. Concomitantly with the variation in distance, the electrostatic capacitance between the first electrodes 62a and the second electrode 64a varies, and the controller 70 receives a signal including the electrostatic capacitance variation from one of the electrode sections, for example, the second electrode 64a. On the basis of such a received signal, the controller 70 senses the pressed state (pressing force) of the cover panel 14. In this embodiment, the force sensing module implies a module configured to sense the pressing force acting thereon by replacing the pressing force with the variation in the electrostatic capacitance between the electrodes concomitant with the variation in the distance between the electrodes due to the action of the pressing force. In the liquid crystal display device, when an input of a predetermined pressing force, for example, a pressing force of 2 to 3 N is sensed by the force sensing module 54, the drive IC 24 executes arbitrary actions such as screen switching, screen expanding, operation selection, and the like by taking the pressing force sensing as a trigger.

According to the liquid crystal display device of this embodiment constituted as described above, by being provided with the force sensing device (force sensing module) 54, it is possible to sense the magnitude of the input pressing force. The force sensing device 54 has a configuration in which only the elastic layer 66 is interposed between the first electrode group and the second electrode, and it is possible to greatly reduce the variation in the gap between the first electrode group and the second electrode resulting from a manufacturing error. Accordingly, it becomes possible to simplify the management of the gap.

The force sensing device 54 can carry out pressing force sensing by itself alone, and hence it is possible to inspect the force sensing device 54 for the force sensing function separately as a single item before the force sensing device 54 is incorporated in the display device or before the force sensing device 54 is attached to the display device. Accordingly, even when a sensing defect of the force sensing device 54 occurs in the sensing function inspection, it is sufficient if only the force sensing device is discarded or repaired, and it is possible to greatly reduce the defective work cost in comparison with the case where the whole display device is to be discarded or repaired.

According to this embodiment, it is possible obtain a force sensing device capable of reducing the variation in the distance between electrodes, and being inspected for the function separately as a single item, and a display device provided with the force sensing device.

Next, force sensing devices according to modification examples, and display devices according to other embodiments will be described. In the modification example and embodiments to be described hereinafter, parts identical to the aforementioned first embodiment are denoted by reference symbols identical to the first embodiment, and a detailed description of the parts is omitted or simplified, and parts different from the first embodiment will mainly be described in detail.

First Modification Example

Figure 8:
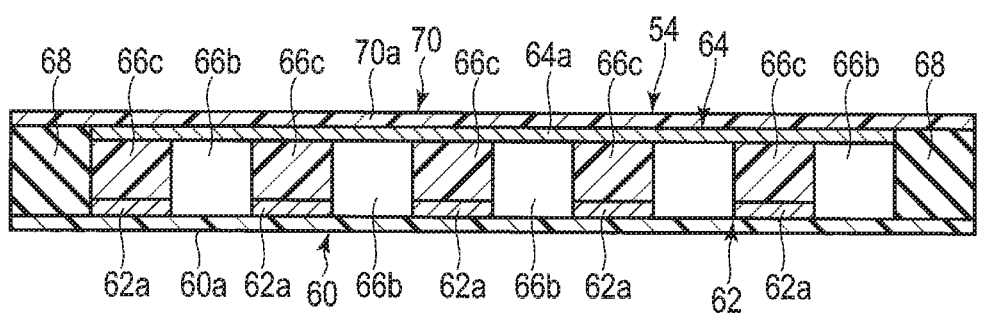
FIG. 8 is a cross-sectional view of a force sensing module according to a first modification example.
Figure 10:
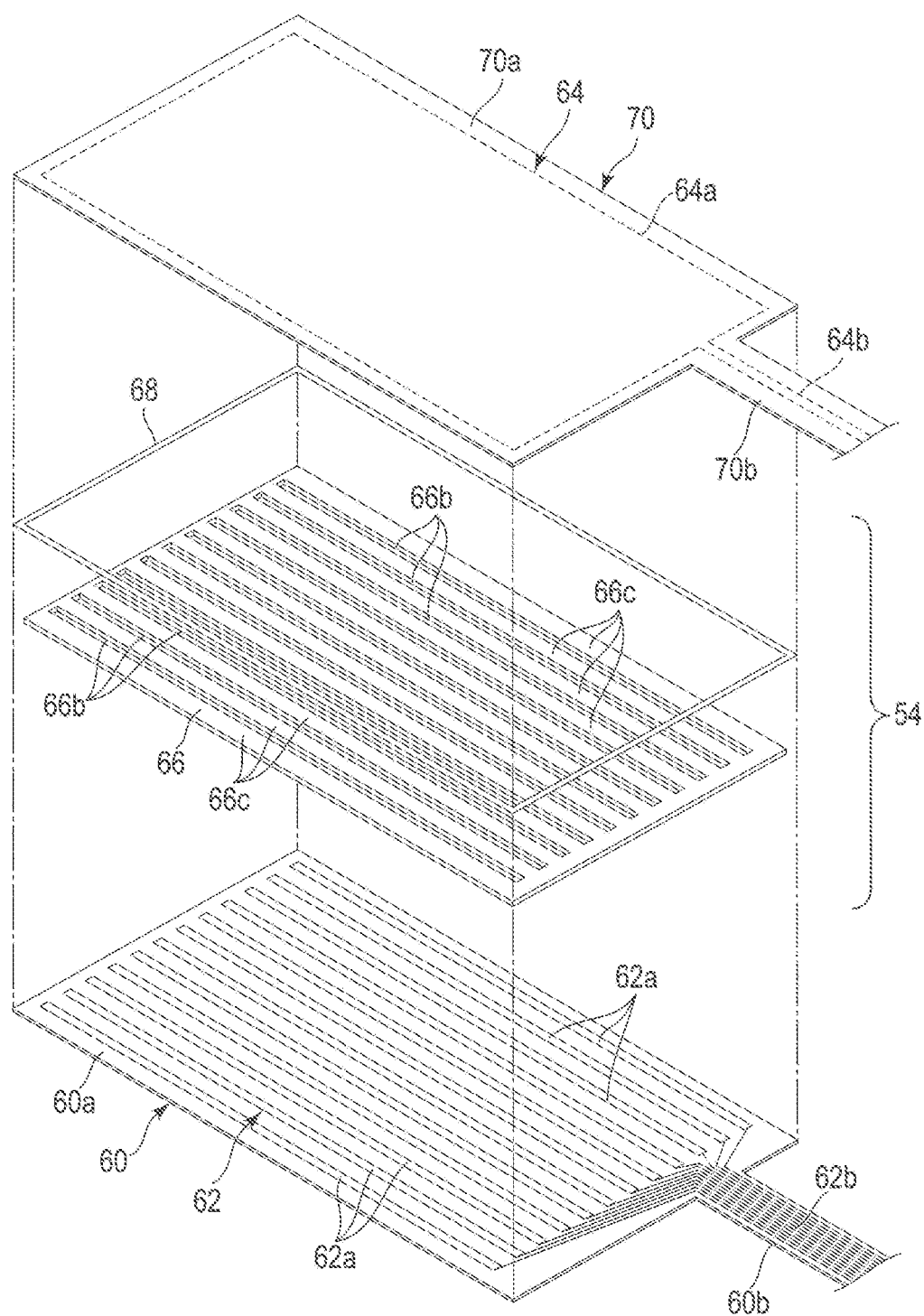
FIG. 10 is an exploded perspective view of the force sensing module according to the first modification example.

FIG. 8 is a cross-sectional view of a force sensing device according to a first modification example, and FIG. 10 is an exploded perspective view of the force sensing device according to the first modification example. According to the first modification example, as shown in FIG. 8 and FIG. 10, an elastic layer 66 of the force sensing module 54 is provided only on each of first electrodes 62a, and is interposed between each of the first electrodes 62a and a second electrode 64a. The elastic layer 66 is constituted of, for example, a rubber sheet, and furthermore, a plurality of slits 66b parallel to each other is formed in the rubber sheet. Thereby, the elastic layer 66 has a plurality of stripe-shaped limbs 66c extending in parallel with each other with a gap between adjacent limb, and these limbs 66c are respectively positioned on the first electrodes 62a. A thickness of each limb 66c is made approximately equal to a gap between the first electrodes 62a and the second electrode 64a. Each limb 66c comes in contact with the first electrode 62a and the second electrode 64a.

In this modification example, although the plurality of limbs 66c of the elastic layer 66 are coupled to each other at both ends in the longitudinal direction, the limbs 66c are not limited to this, and the plurality of limbs 66c may independently be separated from each other. By reducing the area of the elastic layer 66 as described above, it is possible to reduce the resistance of the elastic layer to the pressing force, improve the deformation performance of the elastic layer 66 for the pressing force, and by extension, improve the sensing sensitivity of the force sensing module 54.

Second Modification Example

Figure 9:
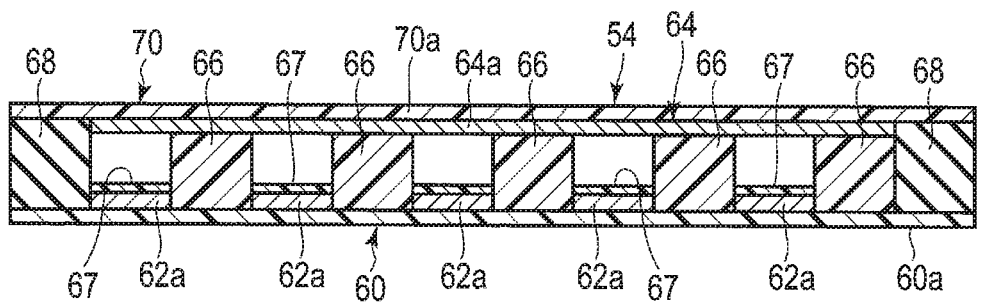
FIG. 9 is a cross-sectional view of a force sensing module according to a second modification example.

FIG. 9 is a cross-sectional view of a force sensing device according to a second modification example. According to the second modification example, an elastic layer 66 of the force sensing module 54 is provided between two first electrodes 62a adjacent to each other, and is held between a first insulating layer 60 and second electrode layer 64. That is, a thickness of the elastic layer 66 is made a thickness approximately equal to a gap between a main body 60a of the first insulating layer 60 and a second electrode 64a. Thereby, the elastic layer 66 is in contact with the first insulating layer 60 and the second electrode 64a, and is held between them. In this case, in order to prevent a short circuit between the first electrode 62a and the second electrode 64a from occurring when the elastic layer 66 is constricted by the pressing force, an insulating layer 67 may be provide on each first electrode 62a. It should be noted that the thickness of the insulating layer 67 is made a thickness sufficiently smaller than the thickness of the elastic layer 66.

Third Modification Example

FIG. 11 is an exploded perspective view of a force sensing device according to a third modification example. According to the third modification example, a second electrode layer 64 includes a plurality of stripe-shaped second electrodes 64a formed of, for example, copper foil, and each extending in a width direction (second direction Y) of a main body 70a of a second insulating layer 70. The plurality of second electrodes 64a are arranged in a longitudinal direction (first direction X) of the main body 70a at predetermined intervals. Each second electrode 64a extends in a direction perpendicular to first electrodes 62a. The second electrodes 64a are provided over the approximately entire surface of the main body 70a except the peripheral edge part of the main body 70a. Furthermore, the second electrode layer 64 includes a plurality of second lines 64b extending from ends of the second electrodes 64a in the longitudinal direction, and further extending along the surface of a belt-shaped part 70b. It should be noted that the number, shape, and the like of the second electrodes 64a are not limited to the modification shown in the drawing, and can be variously changed.

In the force sensing module 54 according to the third modification example too, it is possible to sense a change in the distance between the first electrodes 62a and the second electrodes 64a corresponding to the deformation and constriction of the elastic layer 66 as a change in the capacitance between these electrodes, and sense the input pressing force from the sensed capacitance change amount. Furthermore, by providing the plurality of second electrodes 64a in the direction intersecting the first electrodes 62a, it becomes possible to sense the input position (coordinate position) of the pressing force simultaneously with the sensing of the pressing force.

Fourth Modification Example

FIG. 12 is a cross-sectional view of a force sensing device according to a fourth modification example. According to the fourth modification example, first and second insulating layers 60 and 70 are constituted of a common insulating layer. That is, a sheet of insulating layer is folded back into halves at a turnaround part 72 in the center thereof, and the halves are made to face each other approximately in parallel with each other with a predetermined distance held between them, whereby the first insulating layer 60 and the second insulating layer 70 opposed to each other are constituted. A first electrode layer 62 is formed on the first insulating layer 60, and a second electrode layer 64 is formed on the second insulating layer 70. The first electrode layer 62 is opposed to the second electrode layer 64 with an elastic layer 66 constituted of a rubber sheet or the like interposed between them. Further, three sides of the main body 60a except the side having the turnaround part 72 is stuck to three sides of the main body 70a with an adhesive member (adhesive) 68.

By using the common insulating layer as described above, it is possible to reduce the number of parts or components, simplify position adjustment, and reduce the manufacturing cost of the force sensing module 54.

Fifth Modification Example

FIG. 13 is a cross-sectional view of a force sensing device according to a fifth modification example. According to the fifth modification example, in a force sensing module 54, a bottom plate 18 of a case 22 of a backlight unit 20 is used as a second electrode 64a. That is, the case 22 includes the bottom plate 18 constituted of, for example, a stainless steel plate (SUS plate) having a plate thickness of 0.3 mm, and a support frame 16 attached to the peripheral edge part of the bottom plate 18. A reflection sheet RE, light guide LG, and optical sheets OS1 and OS2 are laid one on top of the other in the order mentioned on the bottom plate 18.

The force sensing module 54 includes a first insulating layer 60 opposed to the bottom plate 18 with a gap held between them, a plurality of first electrodes 62a provided on a main body 60a of the first insulating layer 60, elastic layer 66 provided on the first insulating layer 60, and positioned between first electrodes 62a adjacent to each other, and insulating layer 67 formed on each first electrode 62a. A peripheral edge part of the first insulating layer 60 is stuck to the bottom plate 18 with an adhesive agent (adhesive) 68. Thereby, the main body 60a of the first insulating layer 60 and the first electrodes 62a are opposed to the bottom plate 18 serving as the second electrode 64a approximately in parallel with the bottom plate 18 with a gap held between them. Further, the elastic layer 66 abuts on the bottom plate 18, and is held between the bottom plate 18 and the first insulating layer 60. The bottom plate 18 is connected to the ground potential, and constitutes the second electrode 64a of the force sensing module 54.

As described above, according to the fifth modification example, by using the bottom plate 18 of the case 22 as the second electrode 64a of the force sensing module 54, the second insulating layer can be omitted. Thereby, it is possible to simplify the configuration of the force sensing module 54, and at the same time, reduce the thickness of the force sensing module 54.

Sixth Modification Example

Figure 14:
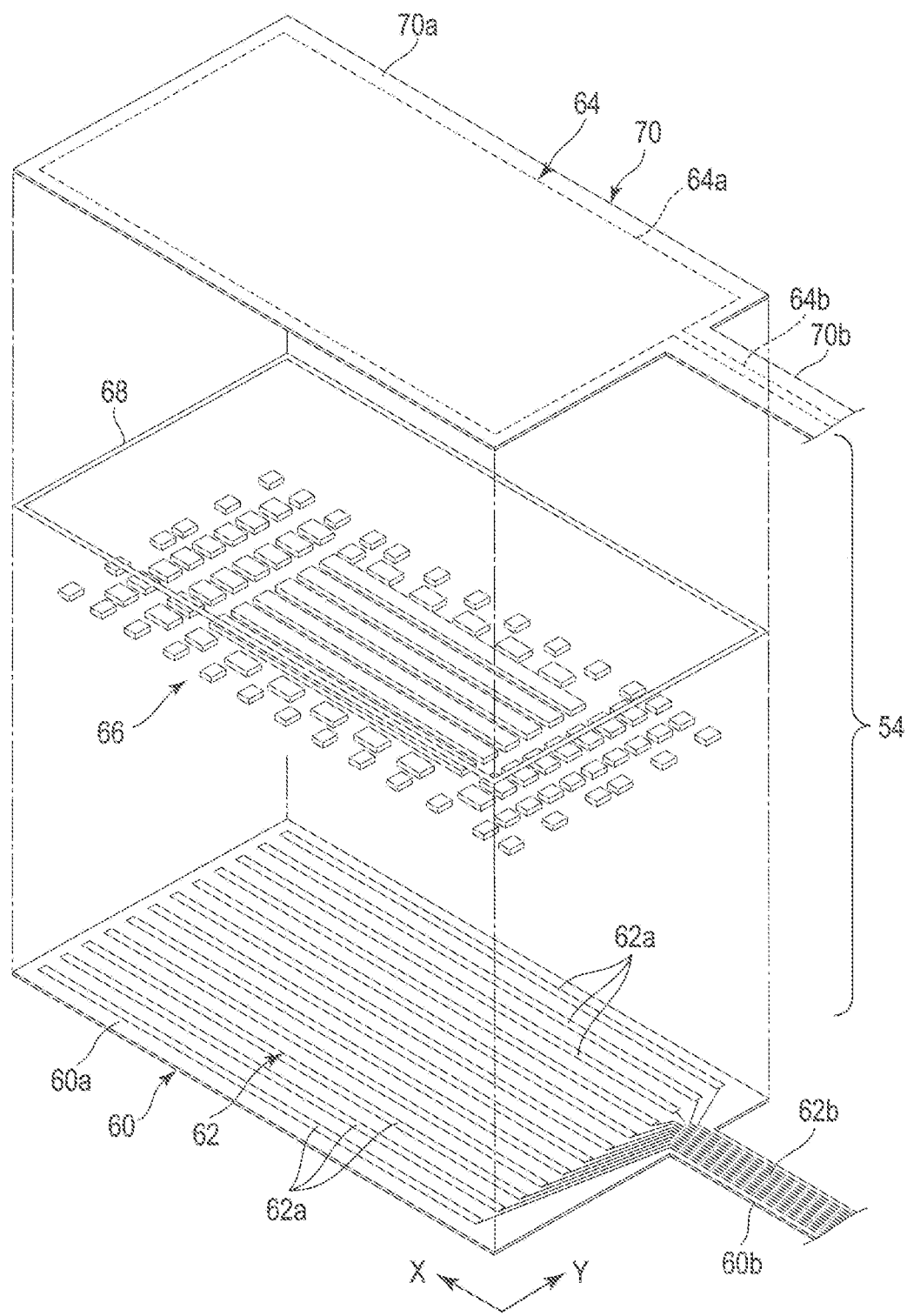
FIG. 14 is an exploded perspective view of a force sensing module according to a sixth modification example.
Figure 15:
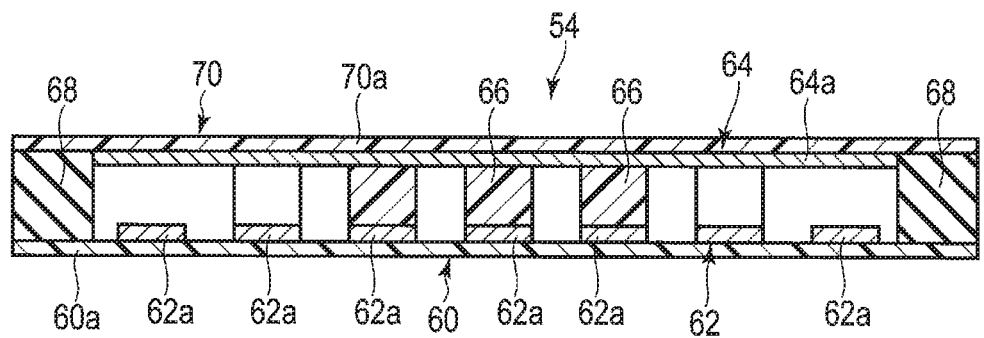
FIG. 15 is a cross-sectional view of the force sensing module according to the sixth modification example.

FIG. 14 is an exploded perspective view of a force sensing device according to a sixth modification example, and FIG. 15 is a cross-sectional view of the force sensing device according to the sixth modification example. According to the sixth modification example, as shown in FIG. 14 and FIG. 15, in an elastic layer 66 of a force sensing module 54, the disposition density thereof per unit area is lowered from the central part of a main body 60a of a first insulating layer 60 toward the peripheral edge part. That is, in the elastic layer 66, the disposition density thereof is higher at the central part of the main body 60a, and the disposition density is lowered from the central part toward the peripheral edge part. Thereby, the force sensing module 54 becomes easier to be deformed at the peripheral edge part than at the central part, and the sensing sensitivity can be enhanced at the peripheral edge part.

Normally, the peripheral edge part of the liquid crystal panel or the backlight unit is harder to be bent or deformed as compared with the central part. That is, the peripheral edge part of the liquid crystal panel is supported on the support frame of the backlight unit, and hence the support frame becomes the fulcrum of the bend or deformation. At a position close to the fulcrum, even when a pressing force identical to a position (for example, the central part of the liquid crystal panel) far from the fulcrum is applied thereto, the bending amount becomes smaller. As a result, it is conceivable that the sensing accuracy becomes somewhat lower at the peripheral edge part of the display area of the liquid crystal panel than the central part.

In the force sensing module 54 according to this modification example, by adjusting the disposition density of the elastic layer 66, the stiffness of the area of the peripheral edge part of the liquid crystal panel close to the fulcrum is set smaller than the central part of the liquid crystal panel. Thereby, when the central part and the edge part of the liquid crystal panel are pressed by the identical pressing force, it becomes possible to sense a bending amount equal to the central part also at the edge part. Accordingly, it is possible to obtain a force sensing module 54 enabling stable force sensing throughout the whole area.

It should be noted that the shape of the elastic layer 66 is not limited to the stripe-shaped or rectangular shape shown in the drawing, and the elastic layer 66 may be formed into a dot-shape, and may be arranged to have density distribution. Further, the configuration is not limited to the configuration in which the disposition density of the elastic layer 66 is changed, and a configuration in which the stiffness of the elastic layer 66, for example, a rubber sheet is made to differ between the central part of the force sensing module 54 and the peripheral edge part thereof may also be employed. Further, not only the configuration in which the elastic layer is formed into rectangular pieces as shown in the drawing but also a configuration in which these pieces are integrated into one body by means of a thin layer is employable. In consideration of these circumstances, it is also possible to form an elastic layer in which an uneven state or a dotted state differs with areas by machining of a flat plate-shaped elastic layer, die injection molding or the like. Further, an elastic layer a thickness of which becomes gradually less from the central part of the force sensing module 54 toward the peripheral edge part of the circumference may be employed, and the elastic layer 66 may also be formed in such a manner that the stiffness thereof becomes lower from the central part toward the peripheral edge part.

Second Embodiment

Figure 16:
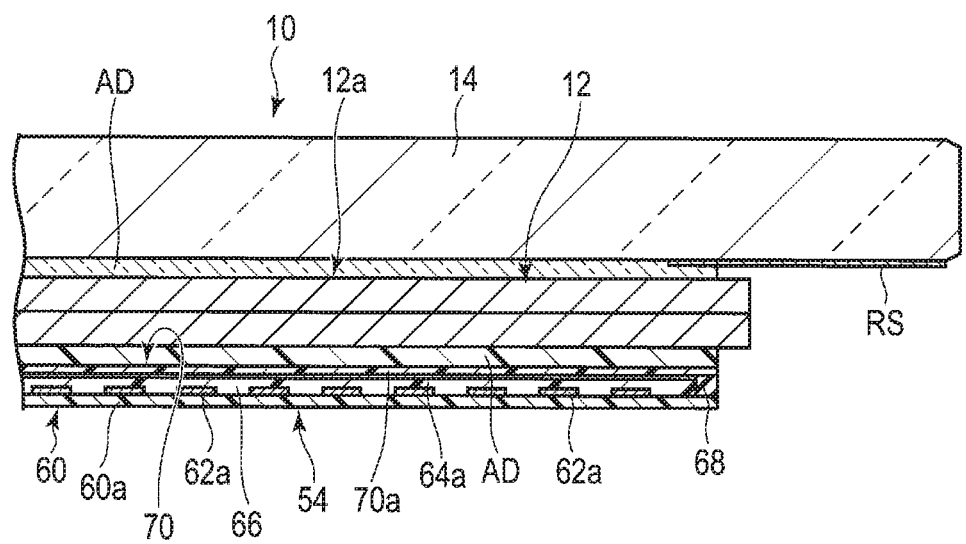
FIG. 16 is a cross-sectional view showing part of a liquid crystal display device according to a second embodiment.

FIG. 16 is a cross-sectional view showing a display device according to a second embodiment. According to this embodiment, in a display device 10, as a display panel 12, a reflective type liquid crystal panel or an organic EL display panel, i.e., a display panel requiring no backlight is used. A transparent cover panel 14 is provided on top of a display panel 12a which is one flat plate-shaped surface of the display panel 12, and further, a force sensing module (force sensing device) 54 is arranged on the back surface side which is the other flat plate-shaped surface of the display panel 12 in opposition to the back surface.

The cover panel 14 is formed of a glass plate or an acrylic transparent resin or the like into a rectangular flat plate. At a peripheral edge part of the back surface (surface on the display panel 12 side) of the cover panel 14, a frame-shaped light shielding layer RS is formed. The back surface (backside) of the cover panel 14 is stuck to the display surface 12a of the display panel 12 with an adhesive having optical transparency or a transparent adhesive or a transparent adhesive agent, for example, an adhesive agent AD constituted of an optical transparent resin, and covers the whole surface of the display surface 12a. It should be noticed that when a reflective type liquid crystal panel is used as the display panel 12, the cover panel 14 is stuck to a polarizer on the display surface side of the liquid crystal panel 12 with an adhesive agent AD in an overlaying manner.

The force sensing module 54 is constituted in the manner identical to one of the force sensing modules according to the aforementioned first embodiment, second embodiment, and the first modification example through the third modification example. Here, the force sensing module 54 is provided with a first insulating layer 60 formed of a polyimide or the like, first electrode layer 62 provided on the first insulating layer 60, second insulating layer 70 formed of a polyimide or the like, and opposed to the first insulating layer 60 with a gap held between them, second electrode layer 64 provided on the second insulating layer 70, and opposed to the first electrode layer 62, and elastic layer 66 held between the first electrode layer 62 and the second electrode layer 64.

A main body 60a of the first insulating layer 60 and a main body 70a of the second insulating layer 70 each have plane dimensions approximately equal to the display area of the display panel 12, and their peripheral edge parts are stuck to each other with, for example, a frame-shaped adhesive agent (adhesive) 68. Thereby, the first electrode layer 62 constituting a plurality of first electrodes 62a, and the second electrode layer 64 constituting a second electrode 64a are opposed to each other with a gap held between them. Further, between the first electrode layer 62 and the second electrode layer 64, and between the first insulating layer 60 and the second insulating layer 70, an elastic layer 66 is held. In this embodiment, the elastic layer 66 is constituted of, for example, a rectangular rubber sheet having a thickness of about 50 μm. The elastic layer 66 has external dimensions slightly smaller than the first insulating layer 60, and is laid inside an adhesive agent 68. The elastic layer 66 is in close contact with the first electrodes 62a and the second electrode layer 64. Furthermore, the elastic layer 66 is also in close contact with the first insulating layer 60.

A thickness of the force sensing module 54 constituted as described above is made about 0.1 to 0.2 mm. The force sensing module 54 is directly stuck to the display panel 12 with an adhesive agent AD, and is opposed to the effective area of the display panel 12.

According to the display device 10 of the second embodiment constituted as described above, by being provided with the force sensing device 54, an input pressing force can be sensed. Further, according to this embodiment, it is possible to directly attach the force sensing module 54 to the display panel 12, and it is not necessary to arrange an optical member such as a light guide LG or the like between the display panel 12 and the force sensing module 54. Accordingly, when a pressing force is input to the cover panel 14 of the display panel 12 by a touch of a finger or the like, it is possible to immediately transmit the input pressing force to the force sensing module 54, and enhance the sensing sensitivity of the force sensing module 54. Besides, in the second embodiment too, the function and advantage identical to the aforementioned first embodiment can be obtained.

Third Embodiment

Figure 17:
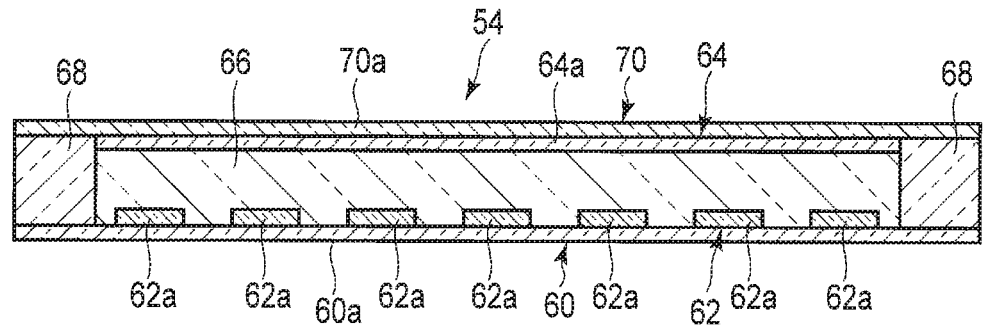
FIG. 17 is a cross-sectional view showing a force sensing device of a liquid crystal display device according to a third embodiment.
Figure 18:
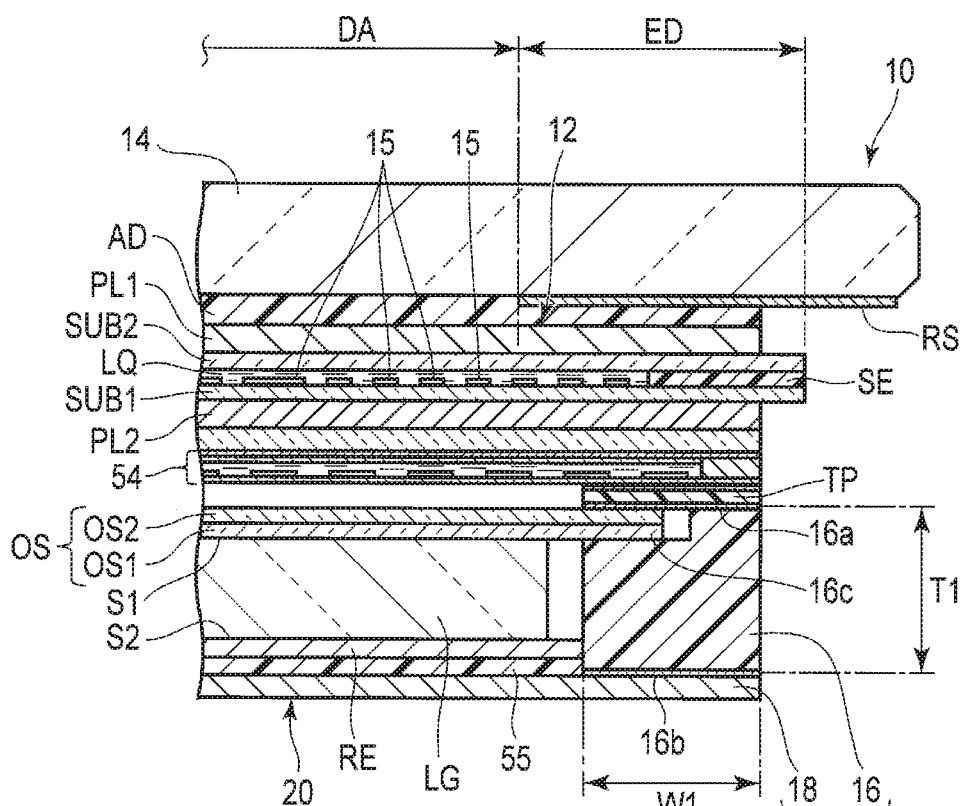
FIG. 18 is a cross-sectional view showing part of the liquid crystal display device according to the third embodiment.

FIG. 17 is a cross-sectional view of a force sensing module of a liquid crystal display device according to a third embodiment, and FIG. 18 is a cross-sectional view of the liquid crystal display device according to the third embodiment. According to this embodiment, a force sensing module 54 is configured to be able to transmit light, and is arranged between a liquid crystal panel 12 and a backlight unit 20 or between the liquid crystal panel 12 and a cover panel 14.

As shown in FIG. 17, a first insulating layer 60 and a second insulating layer 70 of the force sensing module 54 are formed of, for example, optical polyethylene terephthalate (PET), and is made light-transmittable or transparent. A first electrode layer 62 provided on the first insulating layer 60, and a second electrode layer 64 provided on the second insulating layer 70 are formed of a light-transmittable or transparent conductive film such as indium tin oxide (ITO). An elastic layer 66 held between the first electrode layer 62 and the second electrode layer 64 is formed of, for example, a transparent UV curing resin (OCR). Furthermore, an adhesive agent 68 sticking a peripheral edge part of a main body 60a of the first insulating layer 60 and a peripheral edge part of a main body 70a of the second insulating layer 70 to each other may be formed of a material having optical transparency or a transparent material. It should be noted that it is possible to make the aforementioned elastic layer 66 constituted of the UV curing resin serve also as the adhesive agent 68.

The force sensing module 54 having optical transparency as described above does not intercept the light emitted from the backlight unit 20, and it becomes possible for the force sensing module 54 to be arranged at an arbitrary position between the cover panel 14 and the backlight unit 20 in the liquid crystal display device 10. As shown in FIG. 18, in this embodiment, the force sensing module 54 is arranged between the backlight unit 20 and the liquid crystal panel 12. That is, the force sensing module 54 is stuck to a polarizer PL2 on the back surface side of the liquid crystal panel 12 with a transparent adhesive agent AD, and is opposed to a display area DA of the liquid crystal panel 12. The force sensing module 54 is formed into a size having plane dimensions approximately equal to the polarizer PL2, and is stuck to the polarizer PL2 in order.

Further, the backlight unit 20 is arranged on the back surface side of the force sensing module 54, and is attached to the force sensing module 54 with an adhesive agent TP. An outer circumferential surface of a support frame 16 of a case 22 is arranged flush with an outer circumferential surface of the force sensing module 54. An optical sheet OS of the backlight unit 20 is opposed to the force sensing module 54 with a gap held between them.

In this embodiment, a rectangular cushion sheet (cushion material) 55 is laid on a bottom plate 18 of the case 22. The cushion sheet 55 is formed of an elastic material such as urethane foam, sponge or the like. The cushion sheet 55 has external dimensions approximately equal to internal dimensions of the support frame 16, and covers the approximately the whole surface of the bottom plate 18. On top of the cushion sheet 55, a reflection sheet RE and a light guide LG are laid in sequence. It should be noticed that the cushion sheet 55 is crushed when a pressing force is input, and is elastically restored to the original state when the pressing force is removed.

Other configurations of the liquid crystal display device 10 are identical to the aforementioned first embodiment.

According to the third embodiment constituted as described above, the force sensing module 54 is made to have optical transparency, whereby the degree of flexibility in the arrangement of the force sensing module 54 can be increased. That is, the force sensing module 54 can transmit therethrough the outgoing light from the backlight unit 20, and hence it becomes possible for the force sensing module 54 to be arranged not only on the back surface side of the backlight unit 20 but also at an arbitrary position between the cover panel 14 and the backlight unit 20. The force sensing module 54 may also be arranged between the backlight unit 20 and the liquid crystal panel 12 or may be arranged between the liquid crystal panel 12 and the cover panel 14. As described above, it is possible to arrange the force sensing module 54 in the vicinity of the liquid crystal panel 12 or in the vicinity of the cover panel 14 without interposing the backlight unit 20 between the cover panel 14 to which the pressing force is input and the force sensing module 54. Thereby, it becomes easier for the pressing force input to the cover panel 14 to act on the force sensing module 54, i.e., to be transmitted to the force sensing module 54, and thus it is possible to enhance the sensing sensitivity of the force sensing module 54.

Fourth Embodiment

Figure 19:
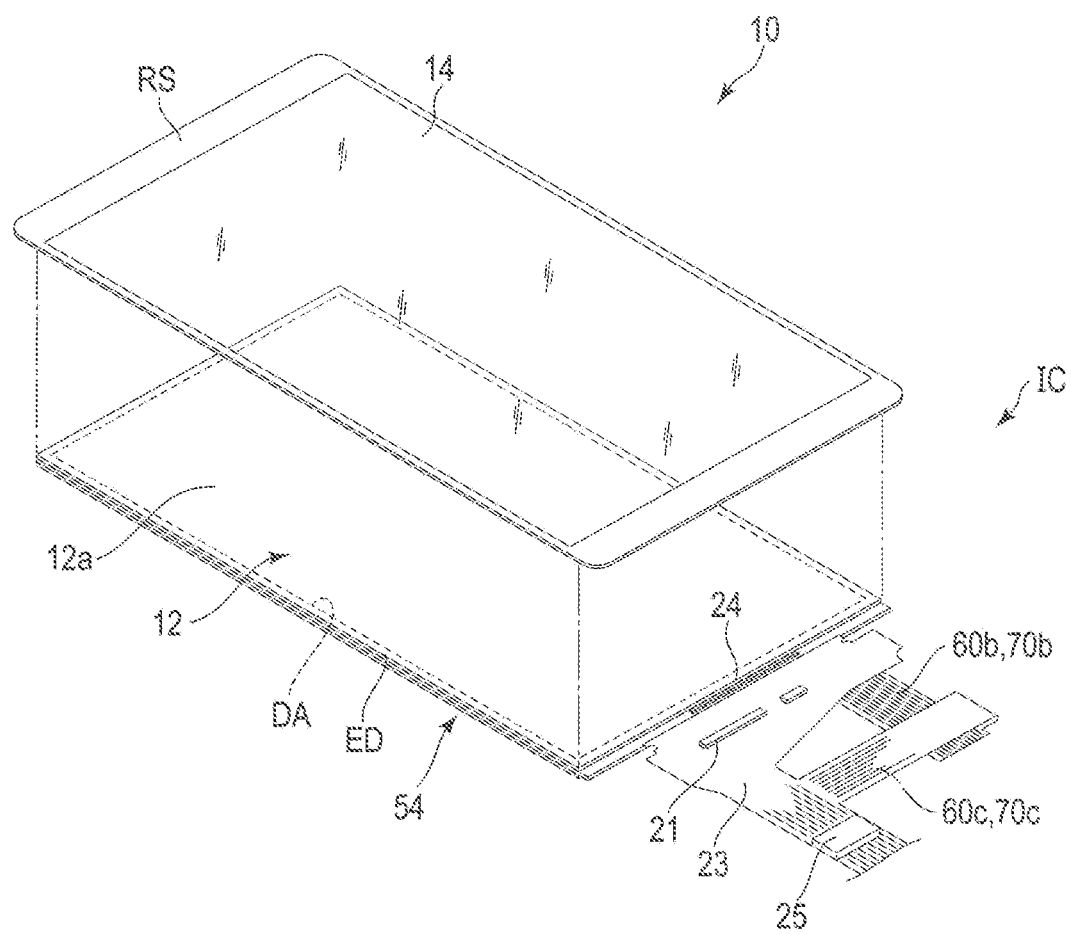
FIG. 19 is a perspective view showing a display device according to a fourth embodiment.

FIG. 19 is a perspective view showing a display device according to a fourth embodiment, FIG. 20 is a cross-sectional view of the display device according to the fourth embodiment, and FIG. 21 is an exploded perspective view of the display device.

According to this embodiment, a force sensing module 54 and main FPC are formed integral with each other by using a common insulating layer and conductive layer. In a display device 10, as a display panel, a reflective type liquid crystal panel or an organic EL display panel is used. Further, the display device 10 is provided with a touch sensing function (touch sensor) of sensing an approach or a touch of a finger to or on a display panel 12.

As shown in FIG. 19 through FIG. 21, the display device 10 is, as an example, provided with a reflective type liquid crystal panel 12, transparent cover panel 14 arranged on top of a display surface 12a which is one flat plate-shaped surface of the liquid crystal panel 12, and covering the whole surface of the display surface 12a, and force sensing module (force sensing device) 54 arranged on the back surface side of the liquid crystal panel 12 which is the other flat plate-shaped surface of the liquid crystal panel 12 in opposition to the back surface. The cover panel 14 can be omitted according to the status of use.

The liquid crystal panel 12 is provided with a rectangular flat plate-shaped first substrate SUB1, rectangular flat plate-shaped second substrate SUB2 arranged in opposition to the first substrate SUB1, and liquid crystal layer LQ sealed between the first substrate SUB1 and the second substrate SUB2. A peripheral edge part of the second substrate SUB2 is stuck to the first substrate SUB1 with a sealing member SE. A polarizer PL1 is stuck to a surface of the second substrate SUB2, whereby a display surface 12a of the liquid crystal panel 12 is formed.

On an inner surface of at least one substrate, for example, the first substrate SUB1, a plurality of electrode parts such as picture electrodes, common electrodes, and the like and wiring, and the like not shown are formed. In this embodiment, the common electrodes also serve as a plurality of first sensing electrodes TX1 to TXn constituting a touch sensor. Each of the first sensing electrodes TX1 to TXn is formed into a stripe-shape, and extends in the longitudinal direction (first direction) of the first substrate SUB1. Further, the first sensing electrodes TX1 to TXn are arranged in the width direction (second direction) perpendicular to the longitudinal direction in parallel with each other at predetermined intervals. On a top surface of the second substrate SUB2, a plurality of second sensing electrodes RX1 to RXn constituting the touch sensor are provided. Each of the second sensing electrodes RX1 to RXn is formed into a stripe-shape, and extends in the width direction (second direction) of the second substrate SUB2, i.e., in the direction perpendicular to the extension direction of the first sensing electrodes TX1 to TXn. The second sensing electrodes RX1 to RXn are arranged in the longitudinal direction of the second substrate SUB2 in parallel with each other at predetermined intervals. It should be noticed that the first sensing electrodes TX1 to TXn and the second sensing electrodes RX1 to RXn are respectively formed of ITO or the like as transparent electrodes. It is also possible to form the second sensing electrodes RX1 to RXn by using metallic thin wires.

As the liquid crystal panel 12, a reflective type display panel configured to display an image by reflecting incident outside light to thereby selectively transmit the light through the display area is used.

The polarizer PL1 is stuck to a top surface of the second substrate SUB2 with, for example, an adhesive agent AD2 constituted of an optical transparent resin to cover the second sensing electrodes RX1 to RXn. Further, the cover panel 14 is formed of, for example, a glass plate or an acrylic transparent resin into a rectangular flat plate. At a peripheral edge part of the back surface (surface on the liquid crystal panel 12 side) of the cover panel 14, a frame-shaped light shielding layer RS is formed. The back surface of the cover panel 14 is stuck to the polarizer PL1 with, for example, an adhesive agent AD2 constituted of an optical transparent resin, and covers the whole surface of the display surface 12a of the liquid crystal 12.

In the example shown in the drawing, on an end part of the short side of the first substrate SUB1, a semiconductor device such as a drive IC chip 24 or the like is mounted as a signal supply source for supplying a signal needed to drive the liquid crystal panel 12. The drive IC chip 24 is formed into a long and thin rectangular shape, and is mounted on the first substrate SUB1 along the side edge of the short side of the second substrate SUB2. Further, a flexible printed circuit board (main FPC) 23 is joined to an end part of the short side of the first substrate SUB1, and is outwardly extended from the liquid crystal panel 12. The main FPC 23 is electrically connected to the drive IC chip 24 on the first substrate SB1 through a plurality of lines (not shown). On the main FPC 23, a touch IC (sensing drive element) 21 and connector 25 may be mounted.

As shown in FIG. 20, a relay FPC 27 is joined to an end part of the short side of the second substrate SUB2. This relay FPC 27 is electrically connected to the second sensing electrodes RX1 to RXn formed on the second substrate SUB2. Furthermore, an extension end of the relay FPC 27 is connected to a connector 25 on the main FPC 23, and is connected to the touch IC through the connector 25 and the main FPC 23. The touch IC 21 includes a sensor. This sensor receives a sensing signal sent from the second sensing electrodes RX1 to RXn through the main FPC 23 and the relay FPC 27 during the touch sensing period to be described later. Further, the touch IC 21 may constitute a controller configured to receive and process a sensing signal sent from the force sensing module (force sensing device) 54 during the force sensing period to be described later.

Figure 22:
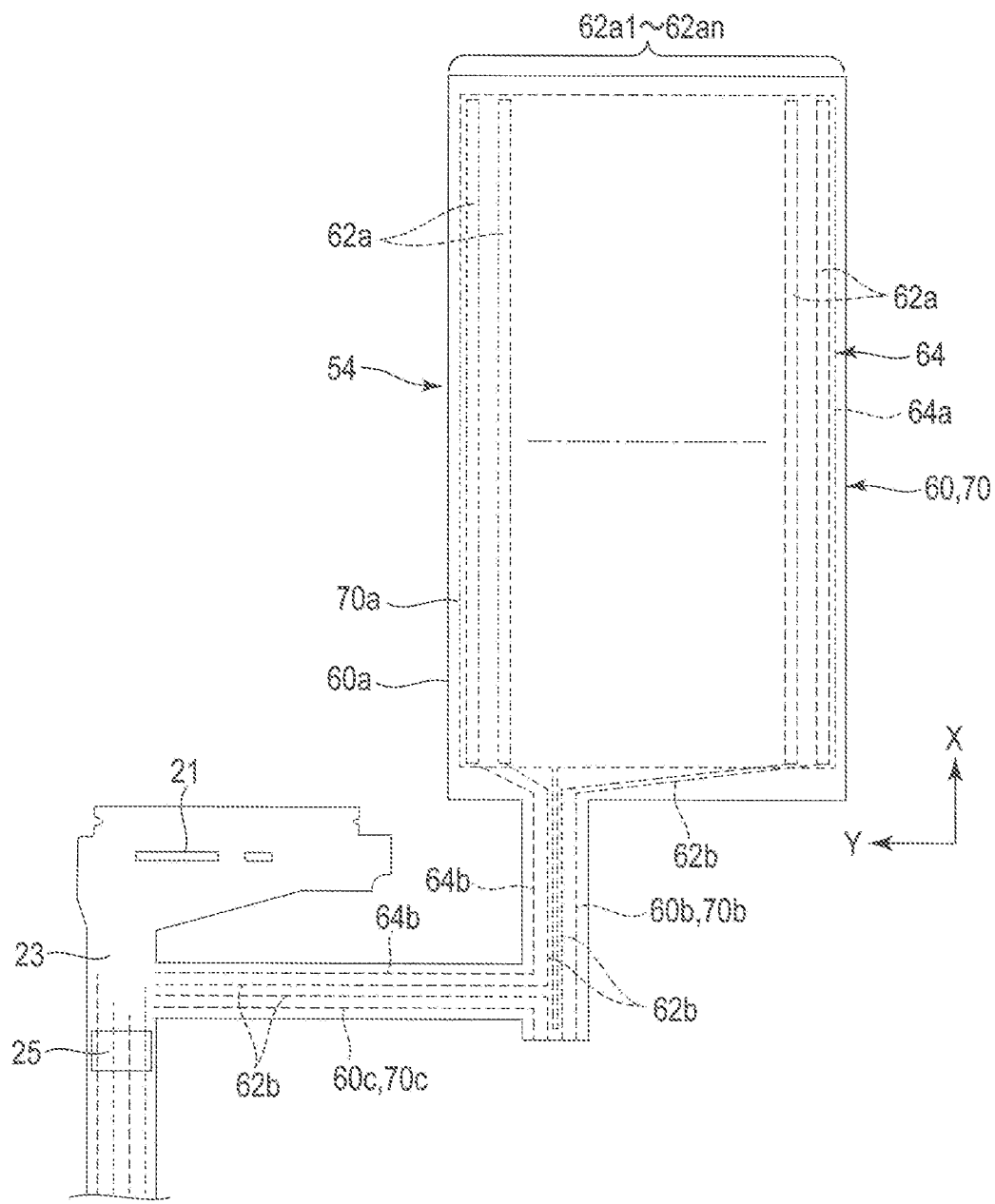
FIG. 22 is a developed view of a main FPC and force sensing module used in the display device according to the fourth embodiment.

FIG. 22 is a plan view showing the main FPC 23 and force sensing module 54 in a developing manner. According to this embodiment, the main FPC 23 and force sensing module 54 are formed integral with each other by using a common insulating layer and common conductive layer, i.e., the main FPC 23 and force sensing module 54 are formed as one continuous part. As shown in FIG. 20, FIG. 21, and FIG. 22, the force sensing module 54 is constituted in the manner identical to one of the force sensing modules according to the aforementioned first embodiment, second embodiment, and the first modification example through the third modification example. Here, the force sensing module 54 is provided with a first insulating layer 60 formed of a polyimide or the like, first electrode layer (conductive layer) 62 provided on the first insulating layer 60, second insulating layer 70 formed of a polyimide or the like, and opposed to the first insulating layer 60 with a gap held between them, second electrode layer (conductive layer) 64 provided on the second insulating layer 70, and opposed to the first electrode layer 62, and elastic layer 66 held between the first electrode layer 62 and the second electrode layer 64.

The first insulating layer 60 includes a main body 60a formed into a rectangular shape having external dimensions (length, width) equal to the dimensions of the second substrate SUB2 and slightly larger than a display area of the liquid crystal panel 12. Further, the first insulating layer 60 includes, in an integrated form, a belt-shaped part 60b outwardly extending from one short side of the main body 60a, and belt-shaped coupling part 60c further extending from the belt-shaped part 60b. The coupling part 60c is connected to the insulating layer (first insulating layer) of the main FPC 23. As described above, the first insulating layer 60 of the force sensing module 54 and the insulating layer of the main FPC 23 are constituted of a continuous common insulating layer.

The first electrode layer 62 includes a plurality of stripe-shaped first electrodes 62a1 to 62an constituted of, for example, copper foil formed on the first insulating layer 60, and respectively extending in the longitudinal direction (first direction X) of the main body 60a. The plurality of first electrodes 62a1 to 62an are arranged in the width direction (second direction Y) of the main body 60a at predetermined intervals. Furthermore, the first electrode layer 62 includes a plurality of first lines 62b respectively extending from ends of the first electrodes 62a in the longitudinal direction and further extending along the surfaces of the belt-shaped part 60b and coupling part 60c.

On top of the insulating layer of the main FPC 23, a conductive layer continuous with (identical layer) the first electrode layer 62 is formed, and a plurality of lines are formed by the conductive layer. At least part or all of the plurality of lines are connected to the first lines 62b extending along the surface of the coupling part 60c.

It should be noted that the number, shape, and the shaped of the first electrodes 62a1 to 61an are not limited to the embodiment shown in the drawings, and can variously be modified.

The second insulating layer 70 includes a main body 70a formed into a rectangular shape having external dimensions (length, width) approximately equal to the main body 60a of the first insulating layer 60. The second insulating layer 70 includes, in an integrated form, a belt-shaped part 70b outwardly extending from one short side of the main body 70a, and belt-shaped coupling part 70c further extending from the belt-shaped part 70b. The coupling part 70c is connected to the other insulating layer (second insulating layer) of the main FPC 23. That is, the second insulating layer 70 of the force sensing module 54 and the insulating layer (second insulating layer) of the main FPC 23 are constituted of a continuous common insulating layer.

The second electrode layer (conductive layer) 64 constitutes a rectangular second electrode 64a constituted of, for example, copper foil, and having external dimensions slightly smaller than the external dimensions of the main body 70a. The second electrode 64a is provided on approximately the whole surface of the main body 70a except the peripheral edge part of the main body 70a. Furthermore, the second electrode layer 64 includes second wiring 64b extending from one end of the second electrode 64a and further extending along the surfaces of the belt-shaped part 70b and coupling part 70c.

On top of the insulating layer of the main FPC 23, a conductive layer continuous with (identical layer) the second electrode layer 64 is formed, and a plurality of lines are formed by the conductive layer. At least part or all of the plurality of lines are connected to the second wiring 64b extending along the surface of the coupling part 70c.

The main body 60a and the main body 70a are stuck to each other at their peripheral edge parts with, for example, an adhesive agent (adhesive) 68. Thereby, the first electrode layer 62 and the second electrode layer 64 are opposed to each other with a gap. Further, the belt-shaped part 60b and the coupling part 60c are respectively stuck to the belt-shaped part 70b and the coupling part 70c with an insulating adhesive agent not shown.

Between the first electrode layer 62 and the second electrode layer 64, and between the first insulating layer 60 and the second insulating layer 70, an elastic layer 66 is held. The elastic layer 66 is formed of a material having elasticity such as rubber, a synthetic resin or the like. In this embodiment, the elastic layer 66 is constituted of, for example, a rectangular rubber sheet having a thickness of about 50 μm. The elastic layer 66 has external dimensions slightly smaller than the main body 60a of the first insulating layer 60, and is laid inside an adhesive agent 68. The elastic layer 66 is in close contact with the first electrodes 62a and the second electrode layer 64. Furthermore, the elastic layer 66 is also in close contact with the first insulating layer 60.

It should be noticed that the material for the elastic layer 66 is not limited to the rubber sheet, and the elastic layer 66 may be formed by filling a gap between the first insulating layer 60 and the second insulating layer 70 with an elastic material in the molten state or the elastic layer 66 may be formed on the first insulating layer 60 and the first electrodes 62a by screen printing using an elastic material in the molten state as a printing material.

As described above, the main FPC 23 and the force sensing module 54 are constituted as one continuous part by using a common insulating layer and a common conductive layer. As shown in FIG. 19, FIG. 20, and FIG. 21, the main FPC 23 is joined to an end part of the first substrate SUB1 of the liquid crystal panel 12, and outwardly extends from the liquid crystal panel 12. Further, the first and second insulating layers are respectively folded back at the positions of the coupling parts 60c and 70c, whereby the force sensing module 54 is arranged in opposition to the back surface of the liquid crystal panel 12. Furthermore, the force sensing module 54 is stuck to the first substrate SUB1 with, for example, an adhesive agent AD3 constituted of an optical transparent resin, and is opposed to the effective display area DA.

Figure 23:
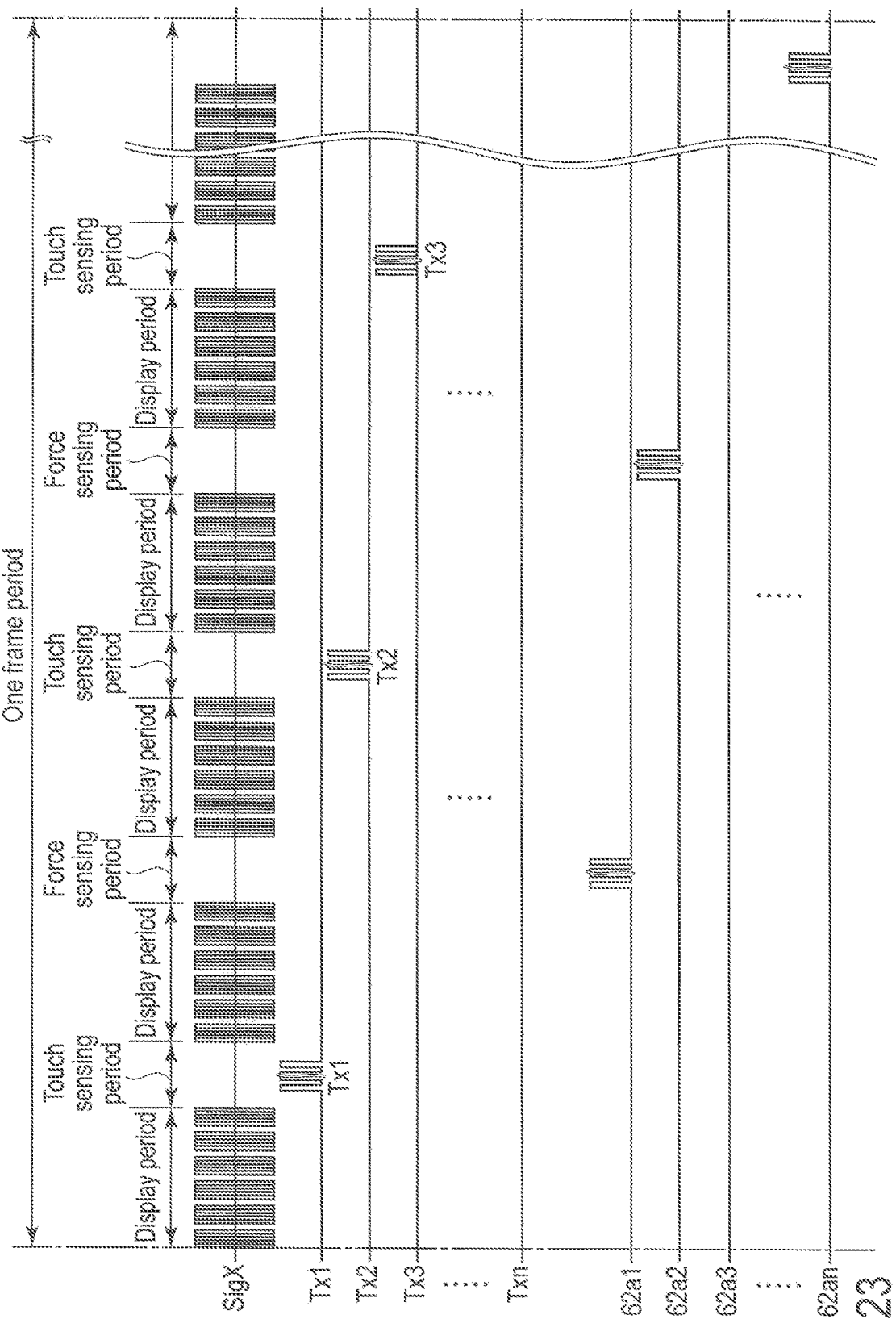
FIG. 23 is a timing chart showing an operation in one frame period of the display device.

The display device 10 repetitively executes one frame period including a plurality of display periods, touch sensing periods, force sensing periods on a time-divisional manner as shown in FIG. 23. The drive IC 24 sends a display signal to display pixels in the display period, and supplies drive signals to the first sensing electrodes TX1 to TXn of the touch sensor in sequence in the touch sensing period. Furthermore, the drive IC 24 supplies drive signals to the first electrodes 62a1 to 62an of the force sensing module 54 in sequence in the force sensing period.

The touch IC 21 receives a sensing signal from the second sensing electrodes RX1 to RXn of the touch sensor, and senses a touch and a coordinate position of the touch on the basis of the sensing signal. That is, in the touch sensing period, when a finger of the operator approaches or touches the cover panel 14, the capacitance between the first sensing electrodes TX and the second sensing electrodes RX varies around the touch position, and the touch IC 21 receives a sensing signal including this capacitance variation from the second sensing electrodes RX. Thereby, the touch IC 21 senses the touch and the touch coordinate position on the basis of the received sensing signal.

Further, the touch IC 21 receives a sensing signal from the second electrode 64a in the force sensing period, and senses the magnitude of the pressing force on the basis of the sensing signal. In the force sensing period, the drive IC 24 transmits a sensor drive signal to the first electrodes 62a1 to 62an. In this state, when the operator touches the cover panel 14 with his or her finger or the like, the cover panel 14 and the liquid crystal panel 12 are slightly bent toward the force sensing module 54 side around the pressed part by the pressing force of the touch. Further, due to the bending, the second electrode 64a of the force sensing module 54 is pressed by the liquid crystal panel 12. The elastic layer 66 is pressed together with the second electrode 64a, and is elastically deformed in the constriction direction (thickness direction). Thereby, the second electrode 64a is displaced toward the first electrodes 62a side, and the distance between the first electrodes 62a and the second electrode 64a is varied. Concomitantly with the variation in the distance, the electrostatic capacitance between the first electrodes 62a and the second electrode 64a is varied, and the touch IC 21 receives a sensing signal including the variation in the electrostatic capacitance from the second electrode 64a. The touch IC 21 senses the pressed state (pressing force) of the cover panel 14 on the basis of this received signal. In the liquid crystal display device 10, when an input of a predetermined pressing force, for example, a pressing force of 2 to 3 N is sensed by the force sensing module 54, the drive IC 24 executes arbitrary actions such as screen switching, screen expanding, operation selection, and the like by taking the pressing force sensing as a trigger.

According to the fourth embodiment constituted as described above, by forming the force sensing module 54 and the main FPC 23 integral with each other by using a common insulating layer and a common conductive layer, i.e., by forming the force sensing module 54 and the main FPC 23 as one part, it is possible to reduce the number of parts of the display device, reduce the manufacturing cost, and improve the assembly facility. Further, according to this embodiment, the touch IC 21 mounted on the main FPC is used for both touch sensing and force sensing. Thereby, it becomes possible to reduce the number of sensing ICs, and reduce the manufacturing cost. Besides, in the fourth embodiment too, the function and advantage identical to the aforementioned first embodiment can be obtained.

It should be noted that in the fourth embodiment, the display panel is not limited to the reflective type liquid crystal panel or the organic EL display panel, and a transmissive type liquid crystal panel may be used. In this case, it is sufficient if the backlight unit is arranged on the back surface side of the liquid crystal panel. Further, in this case, the force sensing module 54 can be provided on the back surface side of the backlight unit or between the bottom plate of the backlight unit and the reflection sheet.

In the fourth embodiment, the configuration for connecting the second sensing electrodes RX of the touch sensor to the main FPC 23 is not limited to the relay FPC, and a configuration in which an electrical conductor is provided on the second substrate SUB2, and the second sensing electrodes RX are connected to the wiring on the first substrate SUB1 and the main FPC through the conductor may also be employed.

Figure 24:
FIG. 24 is a timing chart showing an operation in one frame period of a display device according to a modification example.

Further, in this embodiment, a touch is sensed by the first sensing electrodes TX and the second sensing electrodes RX, and sensing of a force is carried out by the force sensing module 54. Accordingly, by providing a sensor separately for each of touch sensing and force sensing, it is possible to make the touch sensing and the force sensing function independent of each other. According to such a configuration, it is possible to employ a configuration in which a force is also sensed in the touch sensing period as shown in FIG. 24. In this case, although a configuration in which a force is sensed in all the touch sensing periods can be employed, a configuration in which a force is sensed at a rate of once per several touch sensing periods can also be employed. Further, when neither of each of the first sensing electrodes TX nor each of the second sensing electrodes RX serves also as an electrode for image display, touch sensing and display can be carried out in one and the same period.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Note that all the structures which can be carried out by any modification and variation conceived within the scope and spirit of the invention by a person having ordinary skill in the art based on each structural elements described in the embodiments are naturally encompassed in the scope of invention of the present application. Further, regarding the present embodiments, any advantage and effect which would be obvious from the description of the specification or arbitrarily conceived by a skilled person are naturally considered achievable by the present invention.

The external shapes and internal shapes of the constituent members of the liquid crystal panel, backlight unit, and force sensing device are not limited to the rectangular shape, and one or both of the external shape and internal shape may be made other shapes such as a polygonal shape, circular shape, elliptical shape, and a combination of these shapes in planar view. The materials for the constituent members are not limited to the aforementioned examples, and can variously be selected.

What is claimed is:

1. A display device comprising:
   a display panel comprising a first substrate, a second substrate opposed to the first substrate, and a liquid crystal layer sealed between the first substrate and the second substrate;
   a backlight device including a light guide opposed to the display panel, a light source configured to make light incident on the light guide, a reflection sheet opposed to the light guide, and a case including a bottom plate opposed to the reflection sheet; and
   a force sensing device disposed between the reflection sheet and the bottom plate and configured to sense a pressing force input to the display panel,
   wherein
   the force sensing device comprises a first insulating layer, a first electrode layer on the first insulating layer, a second electrode layer opposing the first electrode layer, and an elastic layer between the first insulating layer and the second electrode layer,
   the elastic layer is configured to prevent the first and second electrode layers from coming into contact with each other even while allowing the first and second electrode layers to get close to each other, and
   one of the first electrode layer and the second electrode layer comprises a plurality of electrodes arranged at intervals, and the other electrode layer comprises a planar common electrode opposed to the plurality of electrodes.

2. The display device of claim 1, wherein
   the force sensing device comprises a second insulating layer opposed to the first insulating layer with the first electrode layer and the second electrode layer interposed between the first and second insulating layers, and the second electrode layer is provided on the second insulating layer.

3. The display device of claim 2, further comprising a flexible printed circuit board joined to the display panel, wherein
   the first insulating layer and the first electrode layer of the force sensing device are respectively formed integral with an insulating layer and a conductive layer of the flexible printed circuit board.

4. The display device of claim 3, further comprising:
   a touch sensor including first sensing electrodes on the display panel, and second sensing electrodes opposed to the first sensing electrodes with a gap held between the second sensing electrodes and the first sensing electrodes; and
   a sensing drive element on the flexible printed circuit board, configured to receive a sensing signal from the first sensing electrodes or from the second sensing electrodes, and carry out touch sensing, wherein
   the sensing drive element is connected to the first electrode layer or the second electrode layer of the force sensing device through the flexible printed circuit board, and receives a sensing signal from the force sensing device to carry out pressing force sensing.

5. The display device of claim 2, wherein
   the first insulating layer and the second insulating layer are formed of a continuous common insulating layer including a turnaround part.

6. The display device of claim 1, wherein
   the elastic layer is opposed to the first insulating layer and covers the first electrode layer and the second electrode layer.

7. The display device of claim 1, wherein
   the elastic layer comprises a plurality of belt-shaped or a plurality of dot-shaped elastic bodies held between the plurality of electrodes and the other electrode layer.

8. The display device of claim 1, wherein
   the elastic layer includes a plurality of belt-shaped or a plurality of dot-shaped elastic bodies arranged between the plurality of electrodes and held between the first insulating layer and the other electrode layer.

9. The display device of claim 8, further comprising an insulating layer formed on each of the plurality of electrodes.

10. The display device of claim 1, wherein
the elastic layer possesses disposition density distributions differing between a central part of the first insulating layer and a peripheral edge part thereof.

11. The display device of claim 10, wherein
the disposition density distribution of the elastic layer at the peripheral edge part is lower than the disposition density distribution thereof at the central part.

* * * * *